(12) United States Patent
Yamada

(10) Patent No.: US 10,363,895 B2
(45) Date of Patent: Jul. 30, 2019

(54) AIRBAG DEVICE FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 82 days.

(21) Appl. No.: 15/810,368

(22) Filed: Nov. 13, 2017

(65) Prior Publication Data

US 2018/0154856 A1 Jun. 7, 2018

(30) Foreign Application Priority Data

Dec. 7, 2016 (JP) .................. 2016-238043

(51) Int. Cl.
*B60R 21/16* (2006.01)
*B60R 21/205* (2011.01)
(Continued)

(52) U.S. Cl.
CPC .......... *B60R 21/205* (2013.01); *B60R 21/231* (2013.01); *B60R 21/2338* (2013.01);
(Continued)

(58) Field of Classification Search
CPC . B60R 21/231; B60R 21/205; B60R 21/2338; B60R 21/26; B60R 2021/0004; B60R 2021/0009; B60R 2021/0023; B60R 21/215; B60R 21/203; B60R 2021/23382; B60R 21/235; B60R 2021/23509; B60R 2021/23542; B60R 2021/23576; B60R 2021/0048
(Continued)

(56) References Cited

U.S. PATENT DOCUMENTS 6,073,960 A * 6/2000 Viano .................. B60R 21/231
                                                      280/730.1
2005/0046584 A1* 3/2005 Breed .................... B60C 11/24
                                                      340/13.31
(Continued)

FOREIGN PATENT DOCUMENTS

JP   2016-007892 A   1/2016
JP   2016-016716 A   2/2016

*Primary Examiner* — Toan C To
(74) *Attorney, Agent, or Firm* — Posz Law Group, PLC

(57) ABSTRACT

An airbag is disclosed, including a main bag section deployable in front of a passenger seat, a center bag section which is deployable in such a manner as to protrude towards an inboard side in a vehicle width direction out of the main bag section to an area beneath the rearview mirror. The center bag section includes, on the upper portion as deployed, a region that faces the rearview mirror in an up and down direction. The center bag section internally includes a regulating tether that is disposed generally along an up and down direction and connects the region of the upper portion of the center bag section facing the rearview mirror at airbag deployment and a region of a lower portion of the center bag section deployed beneath the region facing the rearview mirror in order to prevent contact between the center bag section and the rearview mirror.

10 Claims, 29 Drawing Sheets

(51) Int. Cl.
*B60R 21/2338* (2011.01)
*B60R 21/26* (2011.01)
*B60R 21/231* (2011.01)
B60R 21/00 (2006.01)
B60R 21/215 (2011.01)
B60R 21/203 (2006.01)
B60R 21/235 (2006.01)

(52) U.S. Cl.
CPC ............ *B60R 21/26* (2013.01); *B60R 21/203* (2013.01); *B60R 21/215* (2013.01); *B60R 21/235* (2013.01); *B60R 2021/0004* (2013.01); *B60R 2021/0009* (2013.01); *B60R 2021/0023* (2013.01); *B60R 2021/0048* (2013.01); *B60R 2021/23382* (2013.01); *B60R 2021/23509* (2013.01); *B60R 2021/23542* (2013.01); *B60R 2021/23576* (2013.01)

(58) Field of Classification Search
USPC .................................. 280/732, 743.1, 743.2
See application file for complete search history.

(56) References Cited

U.S. PATENT DOCUMENTS

| | | | |
|---|---|---|---|
| 2017/0217399 A1* | 8/2017 | Patel ..................... | B60R 21/233 |
| 2018/0215338 A1* | 8/2018 | Faruque ............. | B60R 21/0136 |
| 2018/0222431 A1* | 8/2018 | Nakanishi ............. | B60R 21/231 |

* cited by examiner

Fig. 23
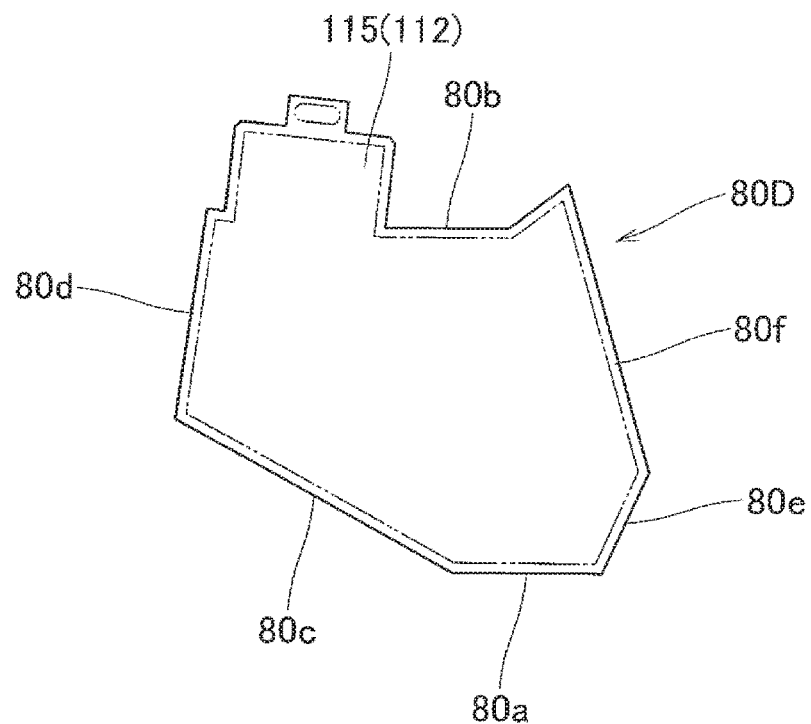
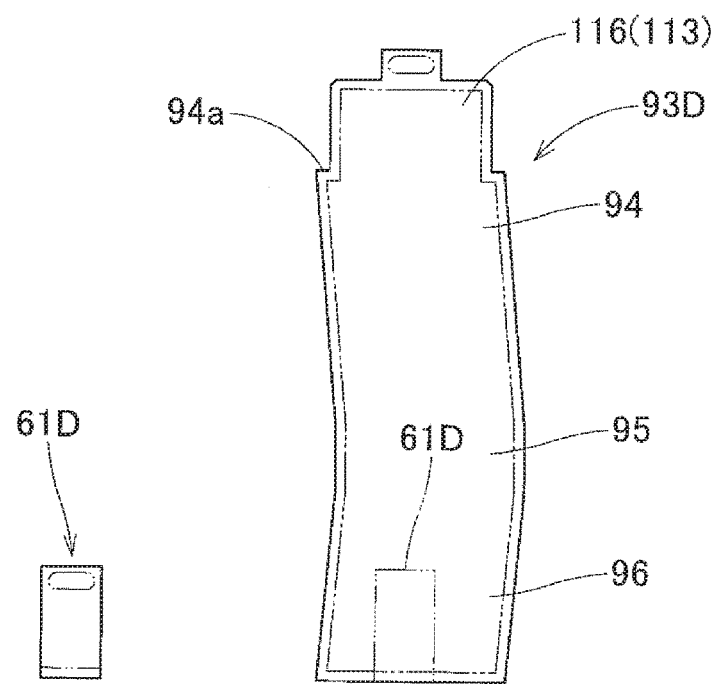

AIRBAG DEVICE FOR A FRONT PASSENGER SEAT

CROSS REFERENCE TO RELATED APPLICATIONS

The Present application claims priority from Japanese Patent Application No. 2016-238043 of Yamada, filed on Dec. 7, 2016, the entire disclosure of which is incorporated herein by reference.

BACKGROUND OF THE INVENTION

1. Field of the Invention

The present invention relates to an airbag device for a front passenger seat adapted to be mounted on an instrument panel of a vehicle in front of the front passenger seat. More particularly, the invention relates to an airbag device for a front passenger seat including an airbag which is housed in a housing in a folded-up configuration and deployable rearward for protecting a passenger when fed with an inflation gas.

2. Description of Related Art

JP 2016-16716 A discloses a known airbag device for a front passenger seat whose airbag includes a main bag section which is deployable towards a front passenger seat and a center bag section which is deployable on an inboard side in a vehicle width direction of the main inflatable section, in front of a space between the passenger seat and driver's seat. A vehicle is usually provided with a rearview mirror which is disposed in such a manner as to protrude downwardly out of the roof in front of the space between the passenger seat and driver's seat. The center bag section of the above-described conventional airbag device is provided, at the region facing the rearview mirror, with a recessed region which is recessed or dented downwardly for receiving the rearview mirror therein such that the airbag is inflated around the rearview mirror.

However, the above-described airbag device is merely configured such that an upper portion of the center bag section is recessed at airbag deployment. With this configuration, when the airbag as inflated catches a passenger and the passenger pushes the airbag forward forcefully, by way of example, there will be a likelihood that the recessed region collapses and the airbag moves upward and pushes the rearview mirror upward.

SUMMARY OF THE INVENTION

An object of the present invention is to provide an airbag device for a front passenger seat which is capable of preventing contact between an airbag and a rearview mirror at airbag deployment.

The object of the invention will be achieved by a following airbag device for a front passenger seat:

The airbag device for a front passenger seat of the invention is adapted to be mounted on a vehicle having a rearview mirror which protrudes downwardly out of the roof of the vehicle. The airbag device includes a housing which is adapted to be mounted on an instrument panel of the vehicle disposed in front of a front passenger seat, and an airbag which is housed in the housing in a folded-up configuration and inflatable with an inflation gas for rearward deployment. The airbag includes:

a main bag section which protrudes rearward out of the housing and deploys in front of the front passenger seat;

a center bag section which protrudes towards an inboard side in a vehicle width direction out of the main bag section and deploys in front of a space between the front passenger seat and a driver's seat, the center bag section as deployed including, on an upper portion thereof, a region which faces the rearview mirror in an up and down direction;

a passenger protection region which is composed of a rear portion of the airbag as deployed for protecting a passenger, the passenger protection region including a front-collision arresting plane for protecting a head of the passenger in the event of a frontal collision of the vehicle and an oblique-collision arresting plane which is disposed on an inboard side in the vehicle width direction of the front-collision arresting plane for protecting the head of the passenger as he moves diagonally forward in the event of an oblique collision or an offset collision of the vehicle; and a regulating tether which is disposed generally along an up and down direction inside the center bag section and connects the region of the upper portion of the center bag section facing the rearview mirror at airbag deployment and a region of a lower portion of the center bag section which is deployed beneath the region facing the rearview mirror, in order to prevent contact between the center bag section and the rearview mirror.

In the airbag device for a front passenger seat of the invention, the regulating tether connects the upper portion and lower portion of the center bag section inside the airbag. With this configuration, even when a passenger is thrown against the passenger protection region and pushes the passenger protection region forward forcefully, the upper portion of the center bag section facing the rearview mirror will not bulge upward, such that the center bag section will be kept out of contact with the rearview mirror.

Therefore, the airbag device for a front passenger seat of the invention is capable of preventing contact between the airbag and the rearview mirror at airbag deployment.

In the airbag device of the invention, if the length in an up and down direction of the regulating tether is smaller than a width in an up and down direction of the center bag section as inflated by itself, the regulating tether will securely help dent the upper portion of the center bag section at airbag deployment such that the center bag section may not contact with the rearview mirror.

In the airbag device of the invention, it is desired that the regulating tether is formed into a band and disposed such that the width direction generally coincides with a width direction of the rearview mirror, and that a width of an upper end region of the regulating tether is generally identical to a width of the rearview mirror and greater than a width of a lower end region of the regulating tether.

This configuration will help dent the region of the center bag section facing the rearview mirror for the width of the rearview mirror such that the center bag section will be prevented from contacting the rearview mirror over a generally entire area in the width direction of the rearview mirror. Further, the configuration that the lower end region of the regulating tether is smaller in width than the upper end region will help reduce the volume of the airbag as folded up.

The center bag section of the airbag device of the invention may include, at the region of the upper portion facing the rearview mirror at airbag deployment, a recessed region which is recessed downwardly relative to a peripheral region for receiving the rearview mirror therein at airbag deployment. The recessed region can be formed by jointing together peripheral edges of a part each of more than one base materials of the center bag section. In this instance, the regulating tether is disposed, connecting the bottom of the recessed region and the region of the lower portion of the center bag section to be deployed beneath the region facing the rearview mirror.

This configuration will steadily help form such a recessed region that the rearview mirror is allowed to enter at airbag deployment. In other words, this configuration will help determine the outer contour of a peripheral region of an opening of the recessed region steadily, such that, by way of example, the peripheral region of the opening of the recessed region be brought into contact with the roof or windshield at airbag deployment. If the peripheral region of the opening of the recessed region is brought into contact with the roof or windshield at airbag deployment, the airbag will be supported by the roof or windshield, and be suppressed from moving forward further when the passenger is thrown against the passenger protection region, thereby arresting him adequately.

Furthermore, it is desired to dispose the regulating tether at such a region that is suppressed from interfering with the head of the passenger when the passenger protection region catches the passenger at airbag deployment. With this configuration, the passenger will be protected smoothly with the passenger protection region with no fear of interference between the head of the passenger and regulating tether, although the regulating tether is disposed generally vertically inside the airbag in such a manner as to intersect with a moving direction of the passenger.

BRIEF DESCRIPTION OF DRAWINGS

FIG. 23 depicts an upper panel and a protruding-section main panel, which are part of base materials of the airbag of FIG. 21, by plan views;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
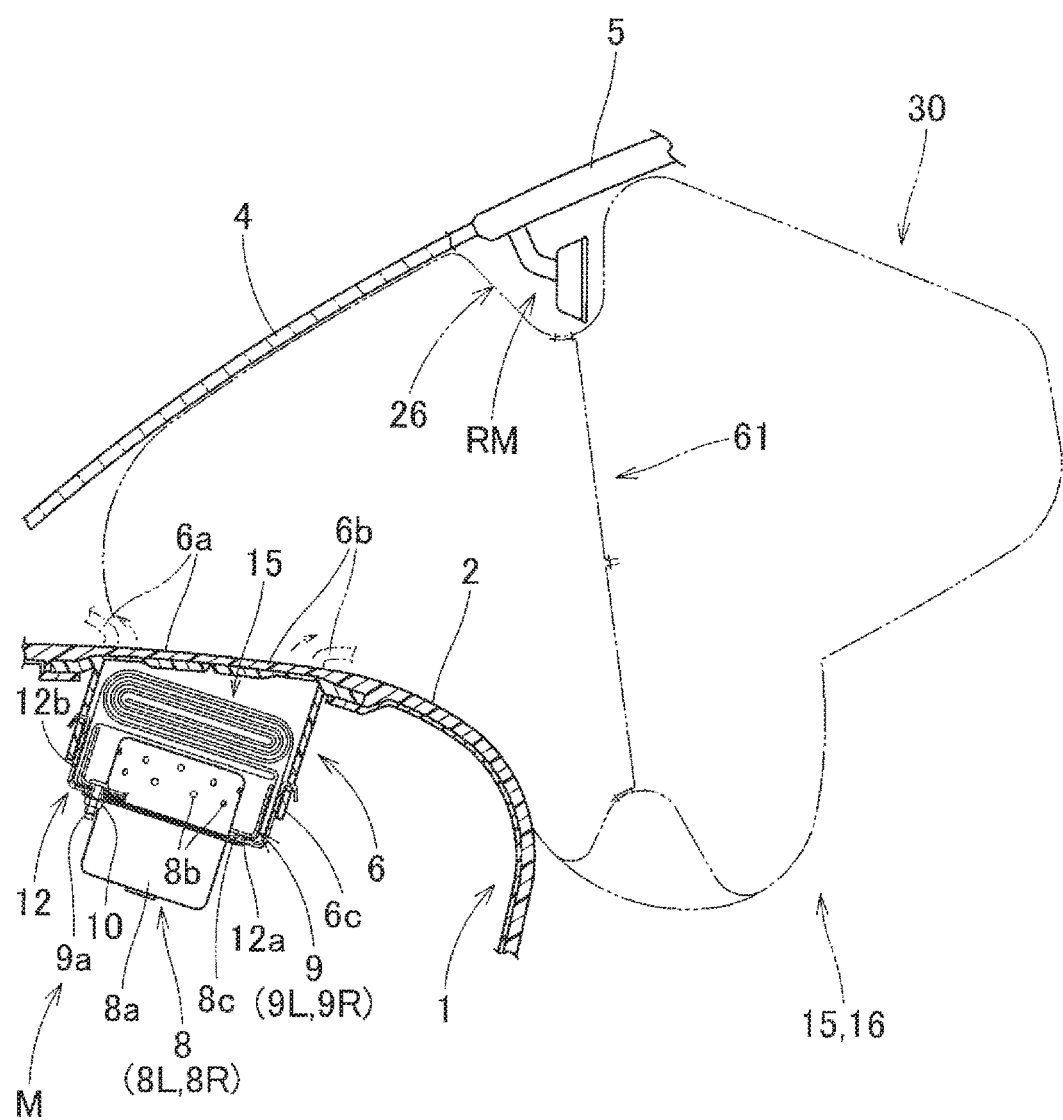
FIG. 1 is a schematic vertical section of an airbag device for a front passenger seat according to one of the preferred embodiments of the invention as mounted on a vehicle.
Figure 2:
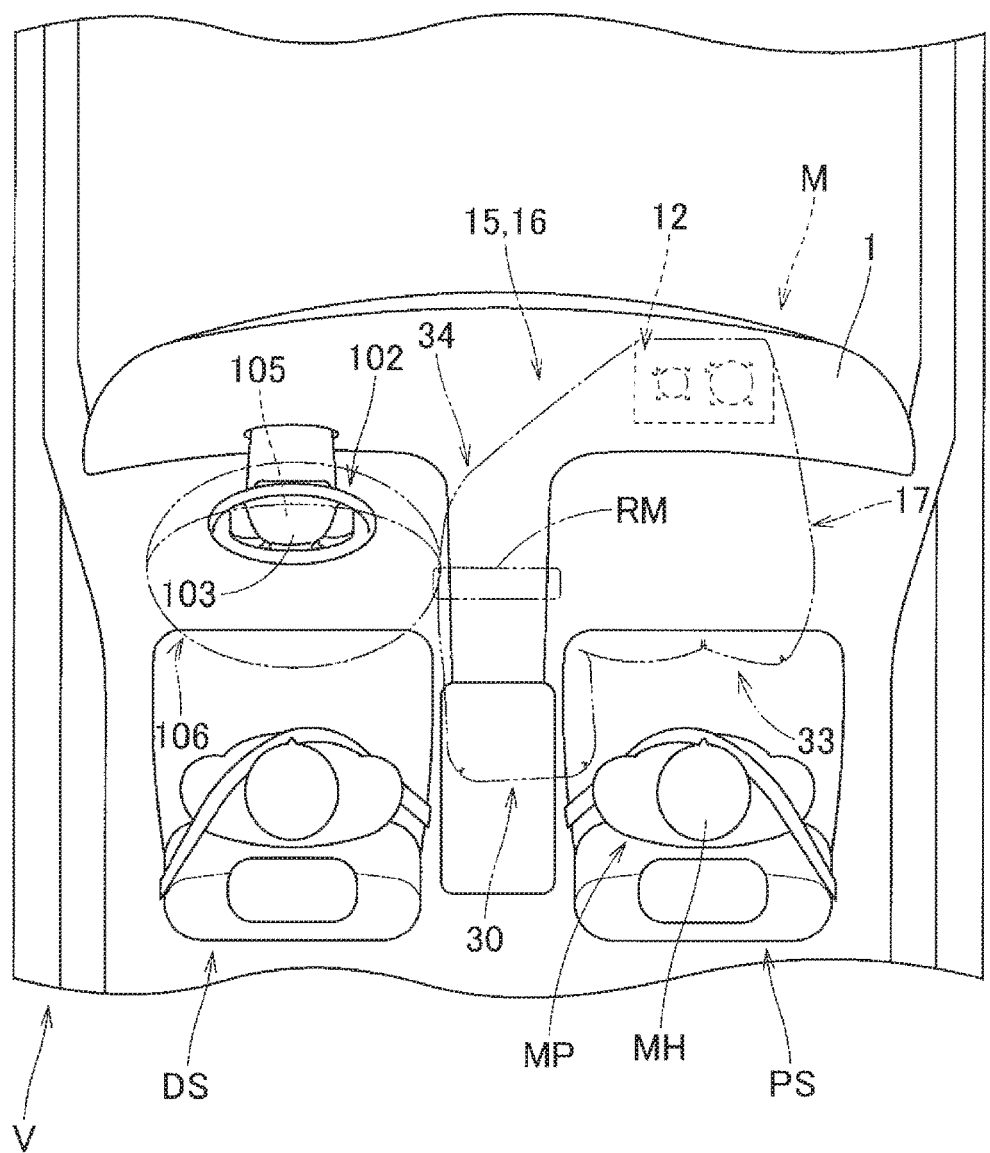
FIG. 2 is a schematic plan view of the airbag device of FIG. 1 as mounted on the vehicle.

FIGS. 1 and 2 depict an airbag device M for a front passenger seat embodying the invention as mounted on a vehicle V. The airbag device M is a top-mount airbag device stored inside a top plane 2 of an instrument panel or dashboard 1 in front of a front passenger seat PS of the vehicle V. Unless otherwise specified, front-rear, up-down and left-right directions in this specification are intended to refer to front-rear, up-down and left-right directions of the vehicle V.

As shown in FIG. 1, the airbag device M includes an airbag 15, which is folded up, two inflators 8 (8L and 8R) for supplying the airbag 15 with an inflation gas, a case or housing 12 for housing and holding the airbag 15 and inflators 8 (8L and 8R), two retainers 9 for mounting the airbag 15 and inflators 8 on the case 12 and an airbag cover 6 for covering the airbag 15 from above.

The airbag cover 6 is integral with the dashboard 1 made from synthetic resin and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

Figure 12:
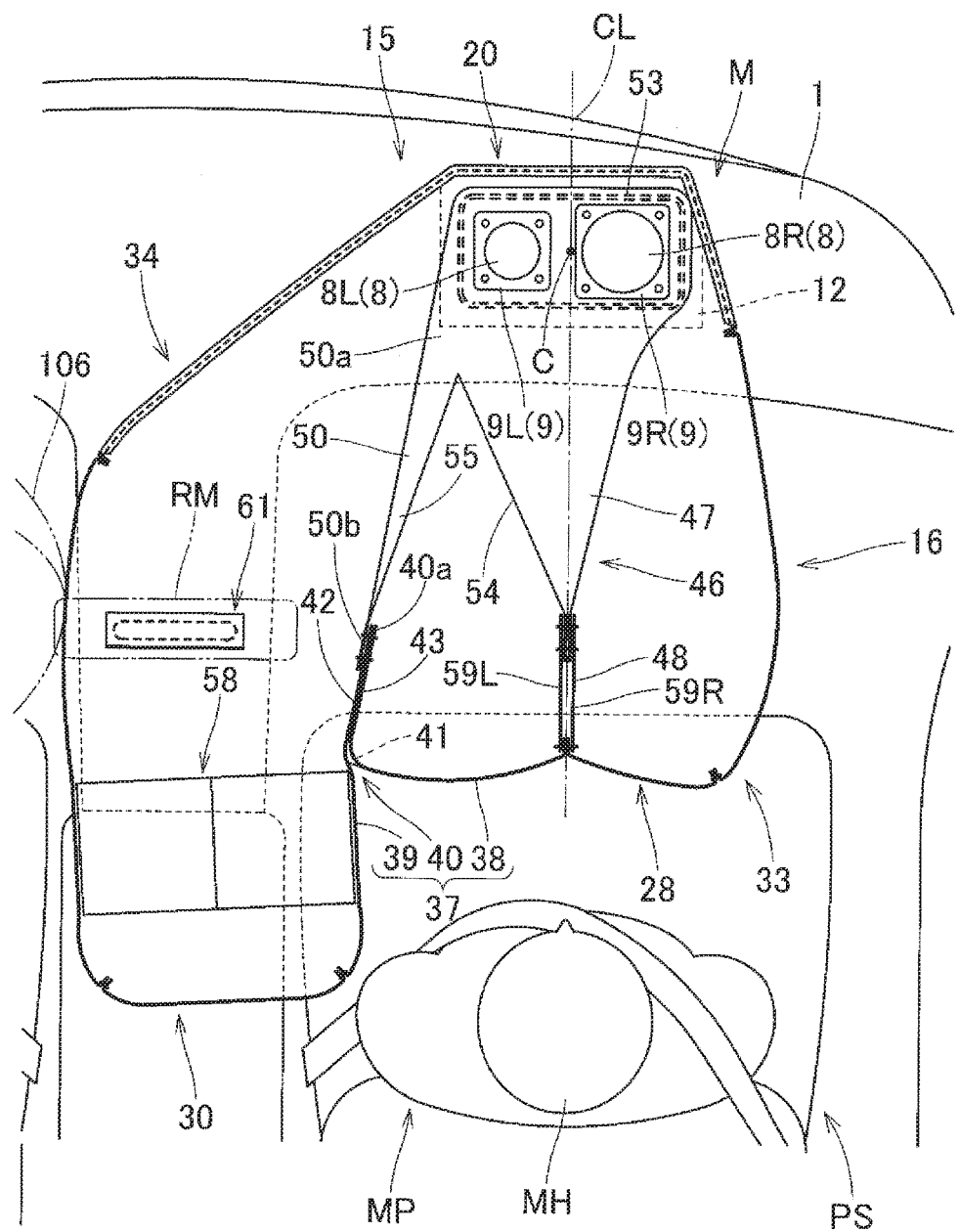
FIG. 12 is a schematic horizontal sectional view of the airbag device of FIG. 1 at airbag deployment.

As shown in FIG. 12, the inflators 8 of the illustrated embodiment are disposed side by side in a left and right direction. In the illustrated embodiment, the inflator 8L disposed on the left side is smaller in outer contour (i.e. has a smaller power) than the inflator 8R disposed on the right side. Although the inflators 8L and 8R are different from each other in size, they have the same configuration. As shown in FIG. 1, each of the inflators 8 (8L and 8R) includes a main body 8a which is formed into a generally pot-like shape and provided with a plurality of gas discharge ports 8b, and a flange 8c for attachment to the case 12. Each of the inflators 8 (8L and 8R) of this specific embodiment is designed to be actuated in the event of a frontal collision, an oblique collision or an offset collision of the vehicle V.

As shown in FIG. 1, the case or housing 12 is made of sheet metal into a generally rectangular parallelepiped with a rectangular opening at the top, and includes a generally rectangular bottom wall 12a which the inflators 8 are inserted into and mounted on from below and a circumferential wall 12b which extends upward from the outer edge of the bottom wall 12a and retains the joint wall 6c of the airbag cover 6. The airbag 15 and inflators 8 (8L and 8R) are attached to the bottom wall 12a of the case 12 through the use of the bolts 9a of the retainers 9 (9L and 9R) serving as mounting means. More specifically, the retainers 9 are located inside the airbag 15 such that the bolts 9a of each of the retainers 9 go through the periphery of later-described gas inlet ports 21 (21L and 21R) of the airbag 15, the bottom wall 12a of the case 12 and each of the flanges 8c of the inflators 8, and the bolts 9a are fastened with nuts 10. Thus the airbag 15 and inflators 8 (8L and 8R) are attached to the bottom wall 12a of the case 12. As shown in FIG. 12, the retainer 9L disposed on the left side is smaller in size than the retainer 9R disposed on the right side so as to correspond to the inflator 8L smaller than the inflator 8R. In the illustrated embodiment, two retainers 9L and 9R are used to mount the inflators 8L and 8R on the case 12. However, the retainers 9L and 9R may be replaced with a single retainer which has a generally rectangular plate shape with two openings for receiving the two inflators. Further, unillustrated brackets are provided on the bottom wall 12a of the case 12 for mounting on a vehicle body structure.

Referring to FIGS. 3 to 8, the airbag 15 includes a bag body 16 inflatable with an inflation gas, and tethers 46, 50, 58 and 61 which are disposed inside the bag body 16 for controlling the contour of the bag body 16 as fully inflated.

The bag body 16 is fabricated of a sheet material having flexibility. As shown in FIGS. 3 to 5, 7 and 8, the bag body 16 includes a principal inflatable section 17 and a protruding inflatable section 30 which is deployable in such a manner as to protrude rearward out of the rear portion of the principal inflatable section 17.

Figure 3:
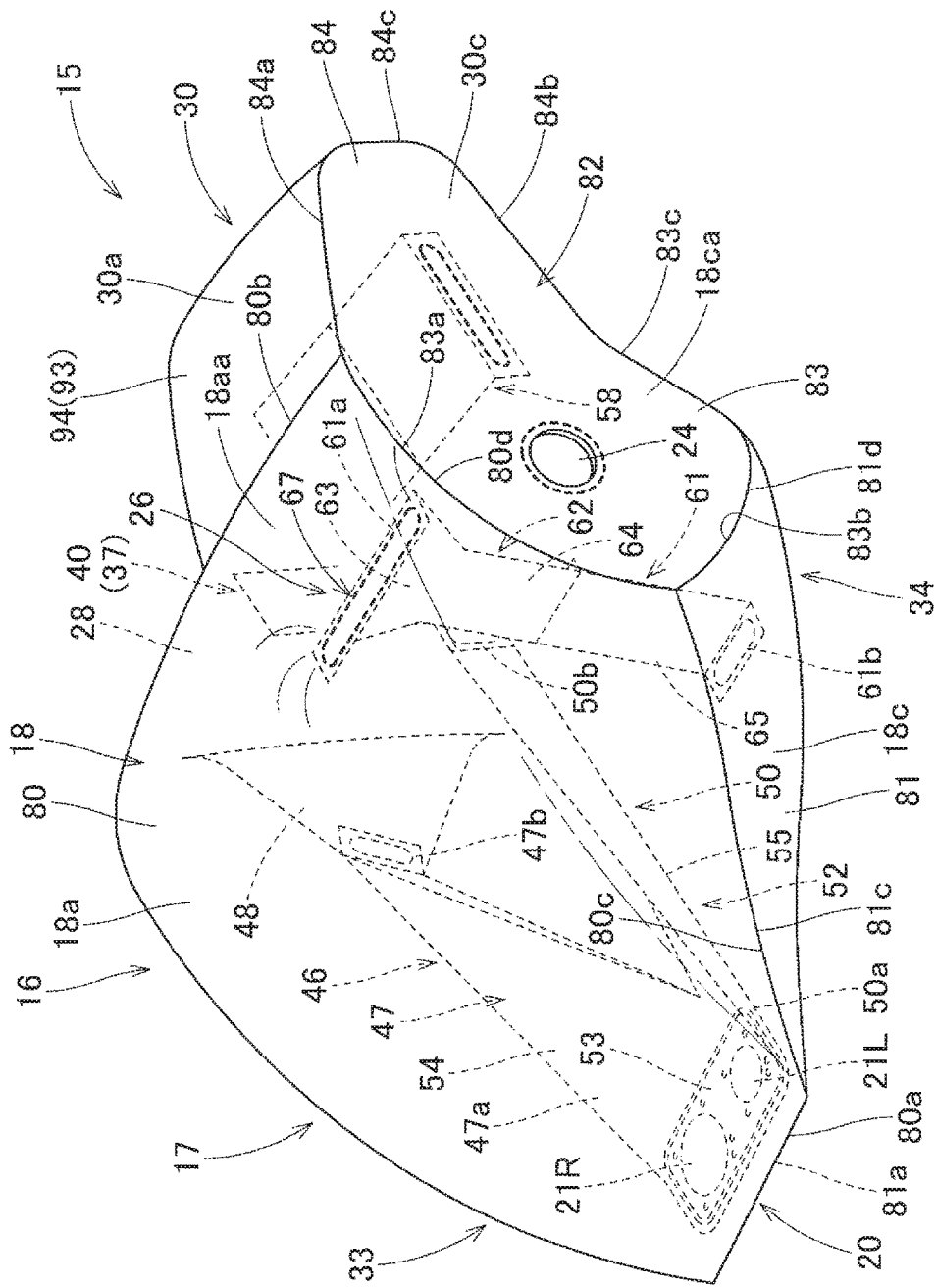
FIG. 3 is a perspective view of an airbag for use in the airbag device of FIG. 1 as inflated by itself, viewed from left front direction.
Figure 4:
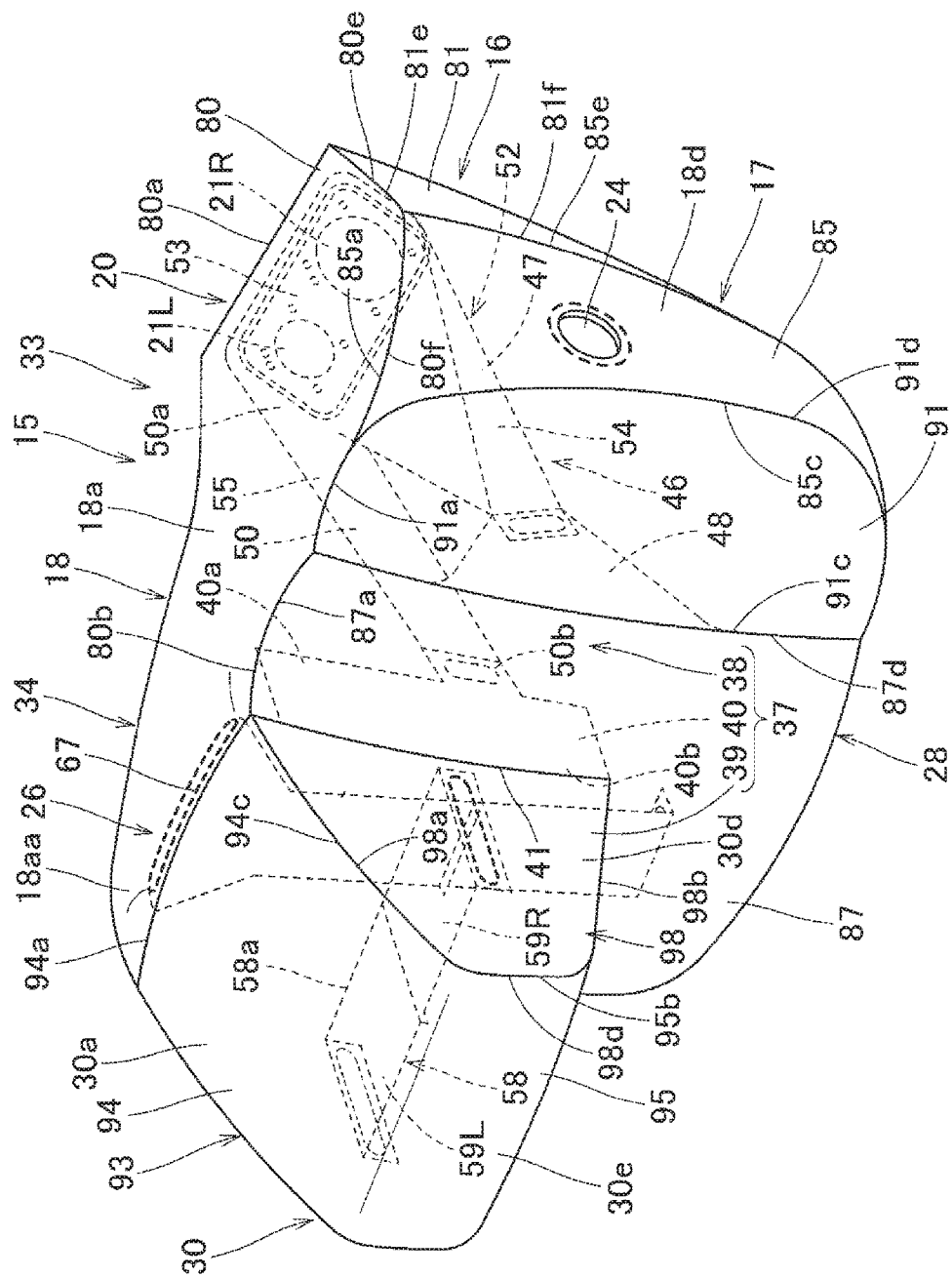
FIG. 4 is a perspective view of the airbag of FIG. 3 as inflated by itself, viewed from right rear direction.
Figure 8:
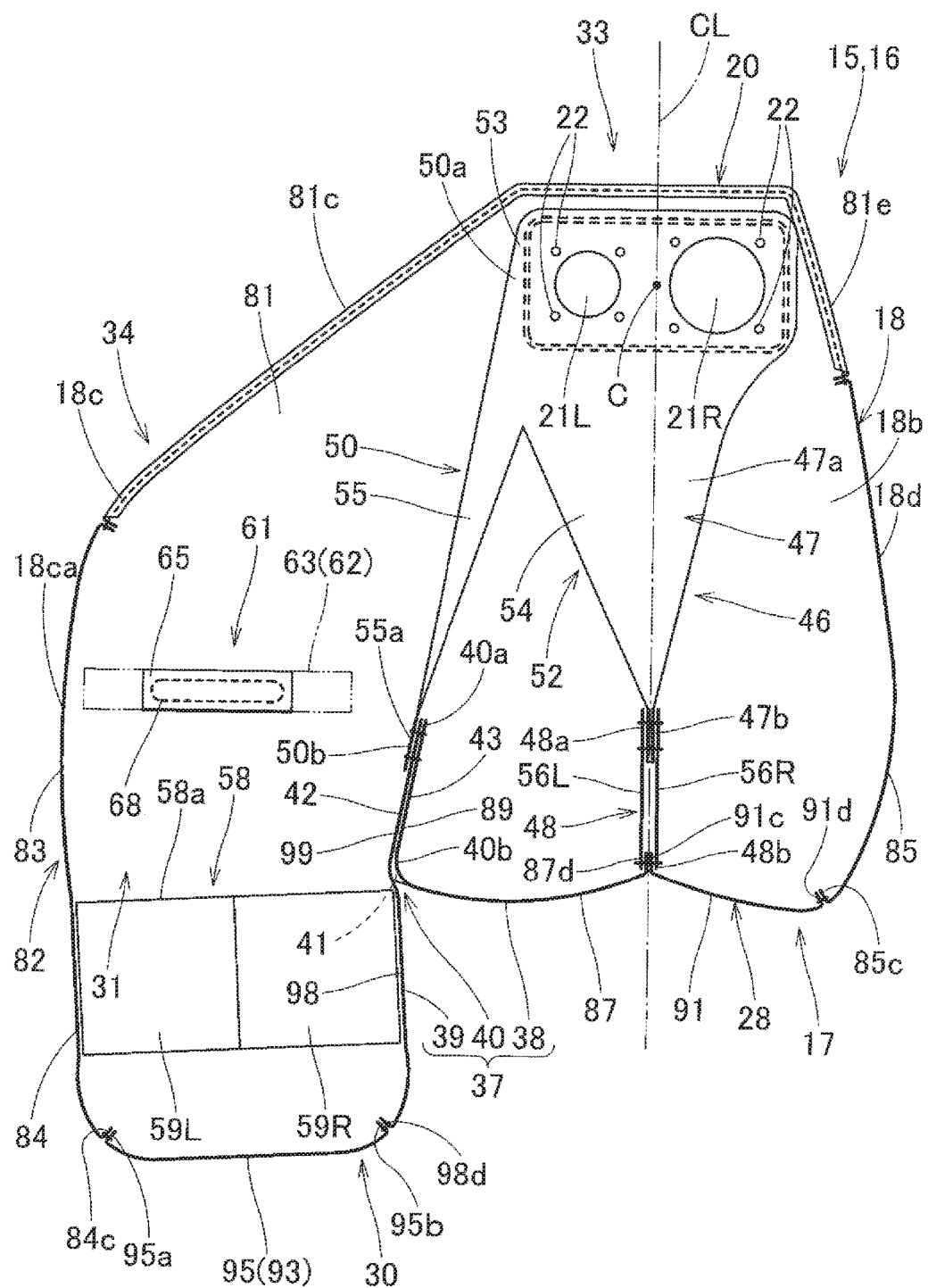
FIG. 8 is a schematic horizontal sectional view of the airbag of FIG. 3.
Figure 11:
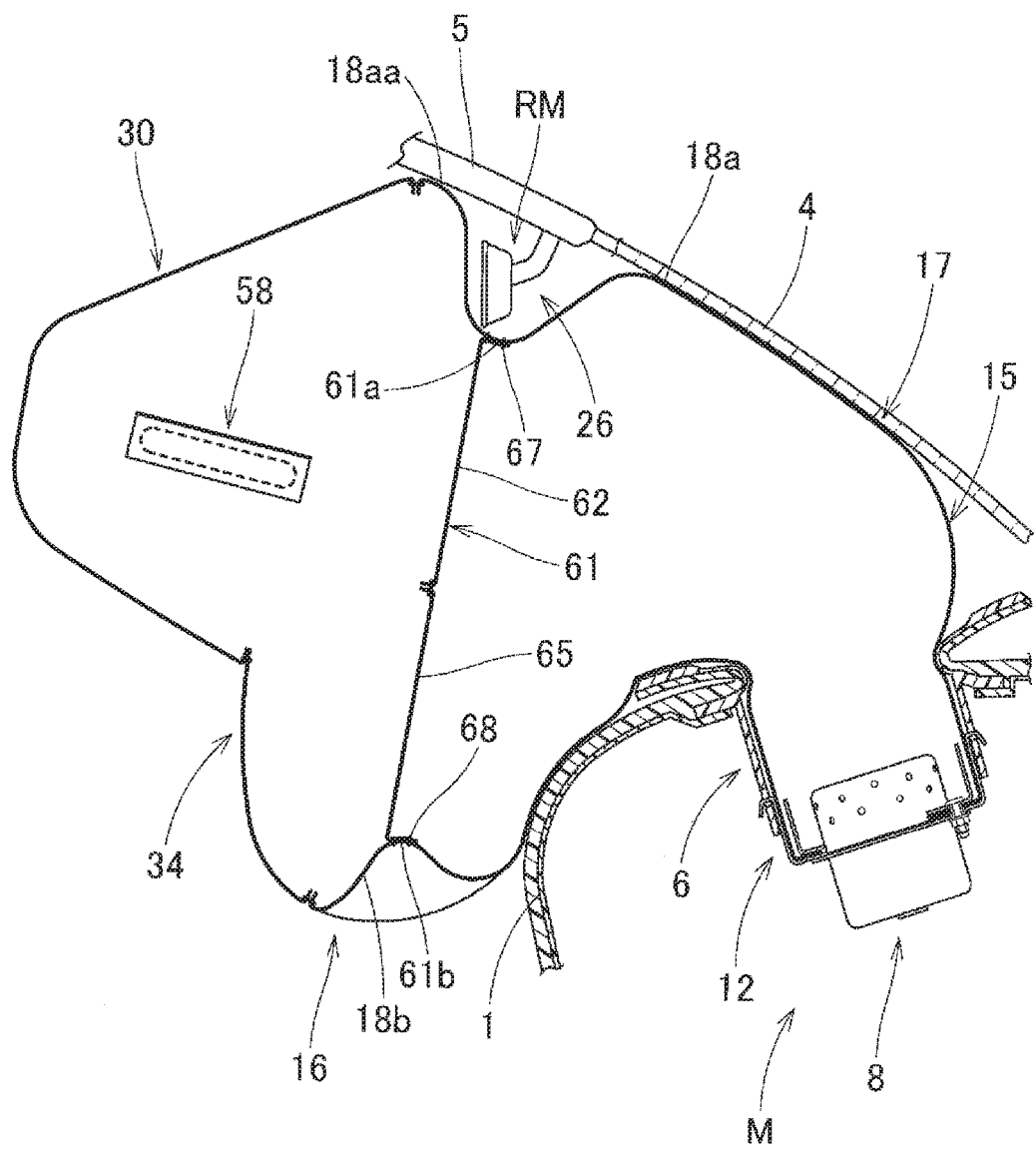
FIG. 11 is a schematic vertical section of the airbag device of FIG. 1 showing the way the airbag as fully deployed circumvents the rearview mirror.

The principal inflatable section 17 is designed to be so deployed as to fill up a space between the top plane 2 of the dashboard 1 and the windshield 4, as indicated in FIGS. 1 (with double-dotted lines) and 11. More specifically, in the illustrated embodiment, the principal inflatable section 17 is designed to be deployed such that the rear upper portion (in other words, a rear portion of a later-described upper wall 18) except a later-described circumventing recess 26 is disposed in proximity to the roof 5 of the vehicle V which is continuous with the windshield 4. Even more specifically, as shown in FIGS. 3 and 4, the outer contour of the principal inflatable section 17 as fully inflated is a generally triangular prism extending in a left and right direction. As shown in FIGS. 3 and 8, the principal inflatable section 17 includes a mounting region 20 at the right front end region as deployed, at which mounting region 20 the principal inflatable section 17 is mounted on the case 12. That is, with the right front end region fixed to the case 12, the principal inflatable section 17 is designed to protrude rearward and towards the left (i.e. towards the inner side in the vehicle width or towards the driver's seat DS) at airbag deployment. In the illustrated embodiment, as shown in FIG. 11, the principal inflatable section 17 is designed such that the rear portion reaches an area beneath the rearview mirror RM which projects downwardly out of the roof 5 at airbag deployment. The principal inflatable section 17 includes a rear side wall 28 deployable at the rear to face a passenger MP and a circumferential wall 18 which extends forward from a peripheral edge of the rear side wall 28 while tapering forward in an up and down direction and in a left and right direction.

The circumferential wall 18 is a portion deployable mainly in such a manner as to fill up the space between the top plane 2 of the dashboard 1 and the windshield 4, and includes an upper wall 18a and a lower wall 18b which are opposed to each other in an up and down direction, and a left side wall 18c and a right side wall 18d which are opposed to each other in a left and right direction. In the illustrated embodiment, as shown in FIG. 11, a rear portion 18aa of the upper wall 18a is designed to be deployed in proximity to (or in contact with) the roof 5. The left side wall 18c (except the rear portion 18ca) is designed to be deployed at a slant with respect to a front and rear direction, in such a manner as to extend rearward and leftward, as shown in FIG. 8. As shown in FIG. 12, the rear portion 18ca of the left side wall 18c is continuous with a later-described left side wall 30c of the protruding inflatable section 30 and extend generally along a front and rear direction, and is designed to be deployed in proximity to an airbag 106 deployed over the steering wheel 102.

Figure 6:
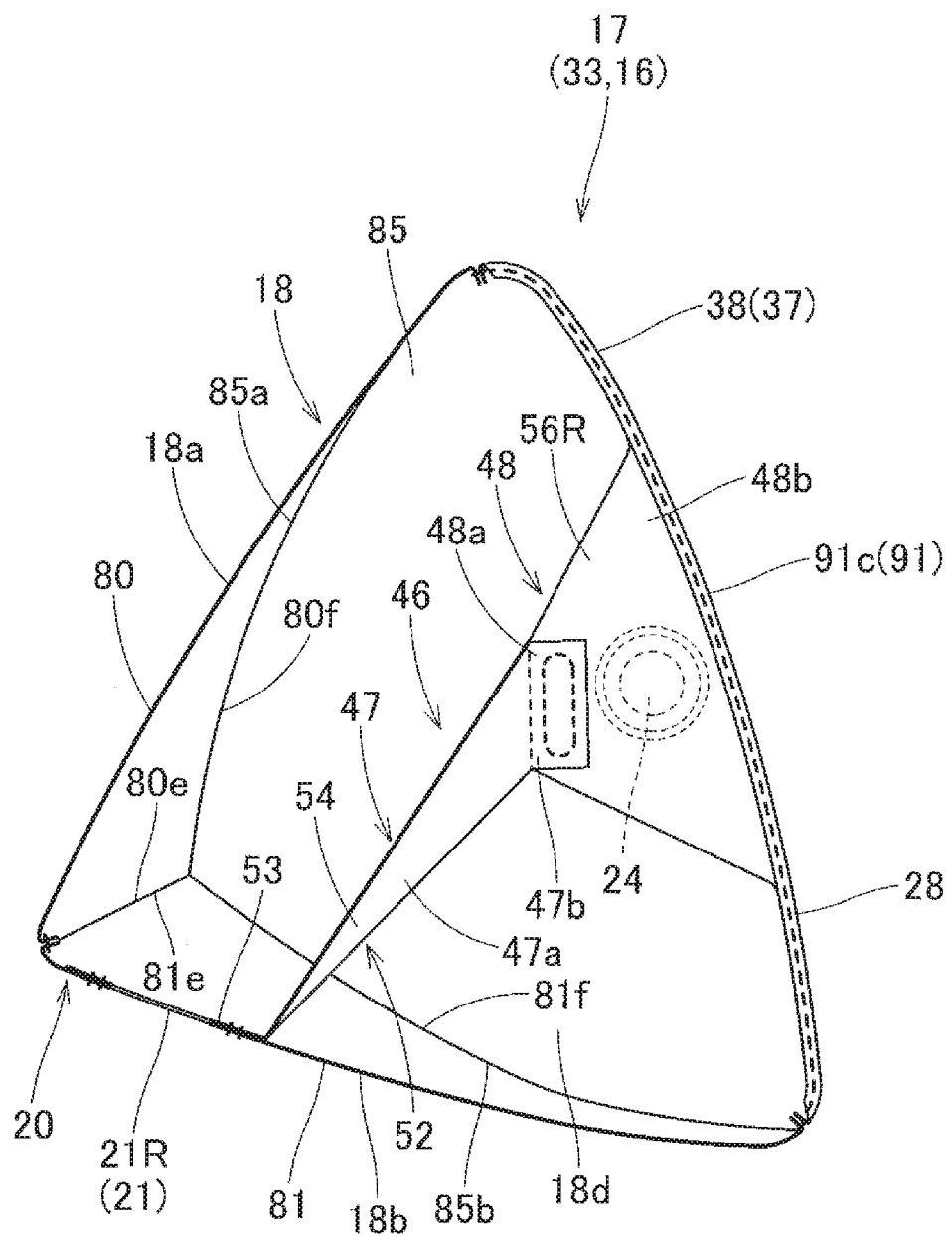
FIG. 6 is a schematic vertical section of the airbag of FIG. 3 taken at the location of a front-rear tether.

In the airbag 15 of the illustrated embodiment, the front end region of the circumferential wall 18 as deployed serves as the mounting region 20 at which the airbag 15 is mounted on the case 12 (FIGS. 3, 6 and 8). The mounting region 20 is provided, at its lower portion (i.e. on the lower wall 18b), with two gas inlet ports 21 (21L and 21R) for receiving the two inflators 8 (8L and 8R) for introducing an inflation gas. The gas inlet ports 21 are each generally round, and are disposed side by side in a left and right direction. As shown in FIG. 8, the gas inlet port 21L disposed on the left side is smaller in inner diameter than the gas inlet port 21R on the right side so as to correspond to the inflator 8L smaller than the inflator 8R. In the periphery of each of the gas inlet ports 21 (21L and 21R) are a plurality of (four, in the illustrated embodiment) mounting holes 22 for receiving the bolts 9a of the retainer 9 which secure the periphery of the gas inlet port 21 to the bottom wall 12a of the case 12. As shown in FIG. 12, in the illustrated embodiment, the airbag 15 is secured to the case 12 and mounted on the vehicle V such that a mounting center C, the center in a left and right direction of the mounting region 20, which is composed of the center of a space between the centers of the gas inlet ports 21L and 21R, coincides with the center in a left and right direction of the front passenger seat PS. A line which runs through the mounting center C in a front and rear direction will be called hereinafter a center line CL. Each of the left side wall 18*c* and right side wall 18*d* of the circumferential wall 18 is provided with a vent hole 24 for releasing an extra inflation gas.

Figure 5:
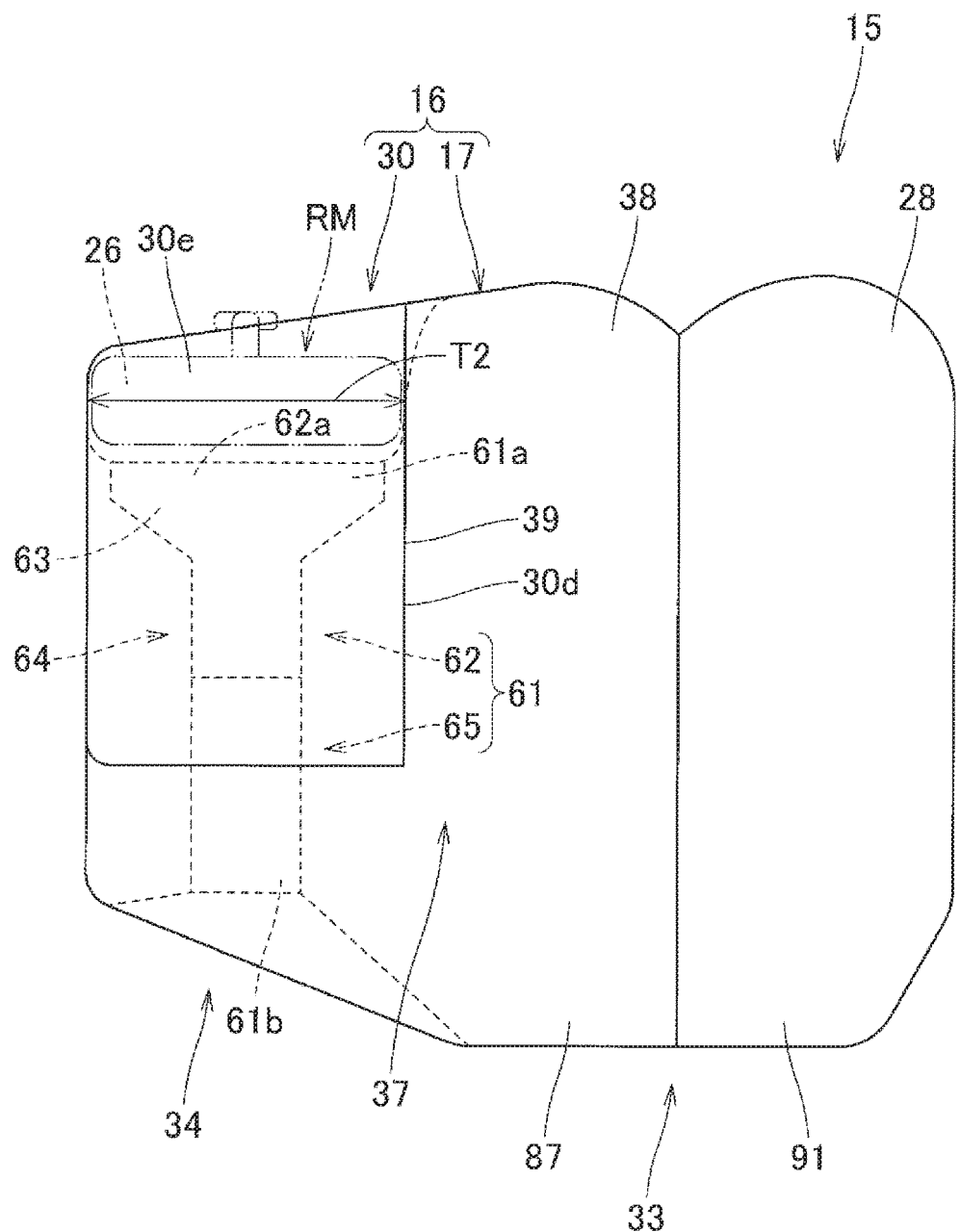
FIG. 5 is a schematic front elevation of the airbag of FIG. 3 as inflated by itself.
Figure 7:
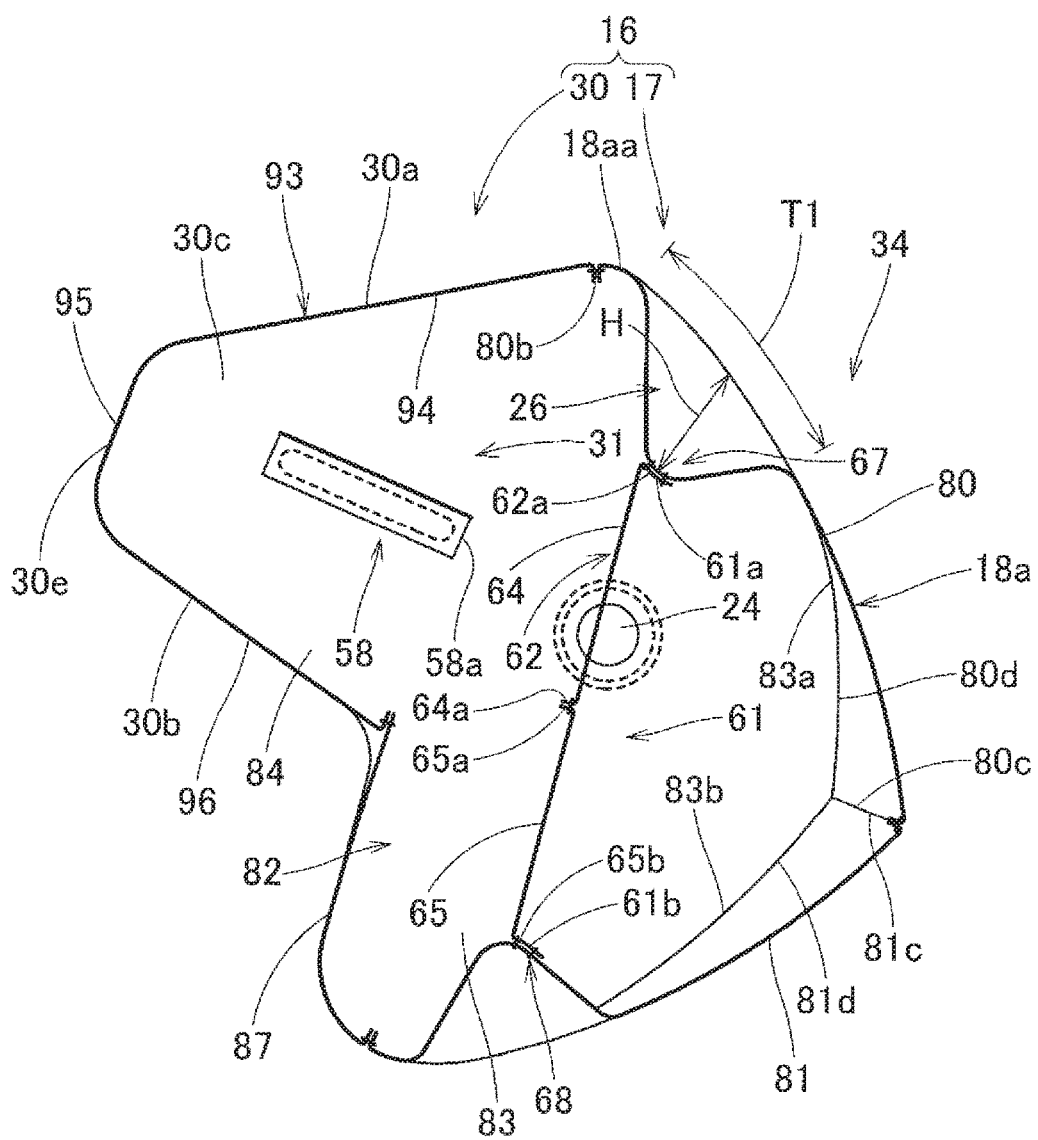
FIG. 7 is a schematic vertical section of the airbag of FIG. 3 taken at the location of a regulating tether.

As shown in FIG. 8, the principal inflatable section 17 of the illustrated embodiment is so designed as to be inflated farther leftward (i.e. towards the driver's seat DS) than rightward. More particularly, the region disposed on the left side of the center line CL at airbag deployment is greater than the region disposed on the right side of the center line CL. More specifically, as described above, the principal inflatable section 17 is configured such that the rear portion reaches the area beneath the rearview mirror RM at the region in front of the generally center of the space between the driver's seat DS and passenger seat PS and the rear portion 18*ca* of the left side wall 18*c* is deployed in proximity to the airbag 106 for the steering wheel 102 as deployed, at airbag deployment. Moreover, the principal inflatable section 17 is configured such that the upper wall 18*a* abuts against the windshield 4 or roof 5 at airbag deployment. As shown in FIGS. 7 and 11, the principal inflatable section 17 includes, at a region of the upper portion to correspond to the rearview mirror RM at airbag deployment, that is, at a region to be deployed at a generally center in a left and right direction of the vehicle V at a vicinity of the front edge of the roof 5, a circumventing recess 26 which helps prevent contact between the principal inflatable section 17 and the rearview mirror RM. As shown in FIGS. 3 and 5, more particularly, the circumventing recess 26 is formed in a vicinity of the left end of the upper portion of the principal inflatable section 17, at a position in front of the protruding inflatable section 30. As described later, the circumventing recess 26 is formed by denting a region of the upper wall 18*a* (an upper joint region 67, a joint of a later-described regulating tether 61 to the upper wall 18*a*) downwardly through the use of the regulating tether 61. In order to accommodate the rearview mirror RM, the circumventing recess 26 is approximately 100 mm in dimension H in an up and down direction (i.e. denting amount) (FIG. 7), 150 mm in opening width T1 in a front and rear direction (FIG. 7), and 240 mm in opening width T2 in a left and right direction (FIG. 5). The rearview mirror RM is approximately 240 to 280 mm in width in a left and right direction, 110 to 130 mm in protruding amount out of the roof 5, and 90 to 100 mm in width in a front and rear direction.

Figure 14:
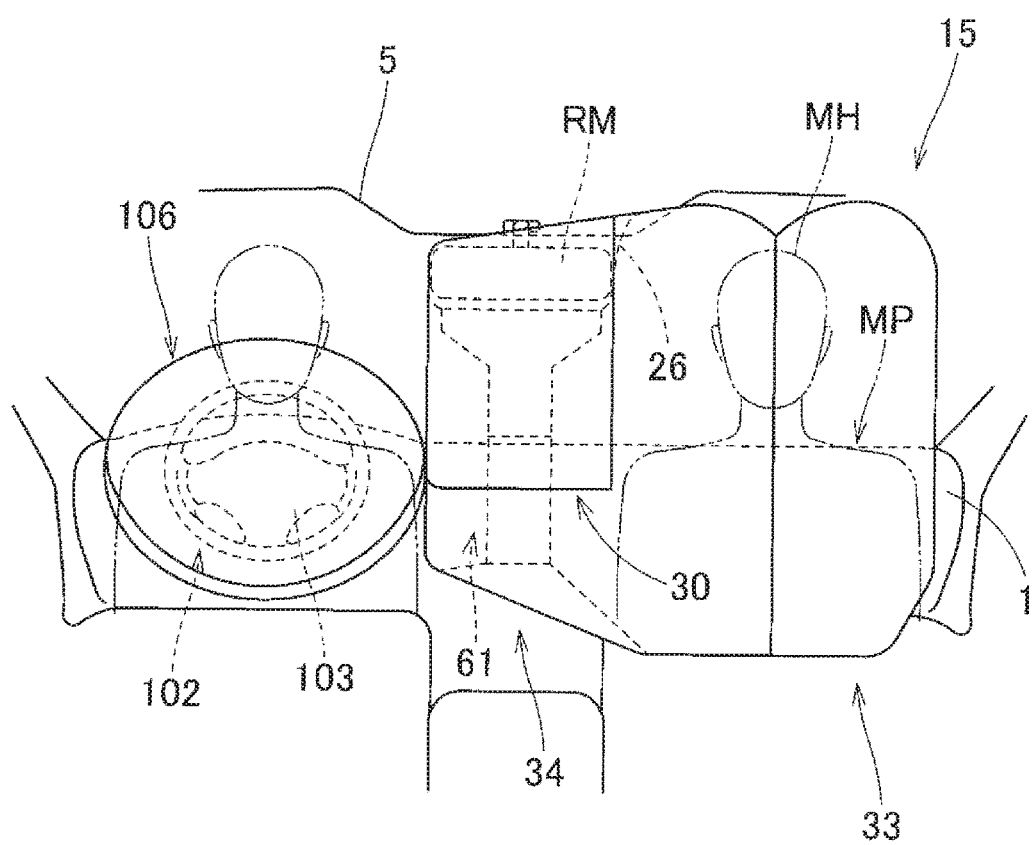
FIG. 14 is a schematic front view of the airbag device of FIG. 1 at airbag deployment.

The rear side wall 28 is deployable generally vertically at the rear to face the front passenger seat PS. The rear side wall 28 of the illustrated embodiment is deployable slightly at a slant relative to an up and down direction, while curving in an up and down direction, such that the lower end protrudes farther rearward than the upper end as shown in FIG. 6. In a horizontal sectional view of the airbag 15 as deployed, the rear side wall 28 extends generally along a left and right direction, as shown in FIG. 8. As shown in FIGS. 12 and 14, the protruding inflatable section 30 is located in an area on the left side of the center in a left and right direction of the rear side wall 28 (i.e. on the left side of the center line CL) in such a manner as to protrude rearward out of the rear side wall 28. More specifically, the protruding inflatable section 30 is formed at a left upper area of the rear side wall 28 as deployed, thus deployable at an obliquely left front position of the head MH of the passenger MP sitting in the front passenger seat PS, as shown in FIGS. 12 and 14.

The protruding inflatable section 30 is designed to be inflated into a generally square truncated cone narrowing rearward in an up and down direction. The protruding inflatable section 30 communicates with the principal inflatable section 17 via a communication region 31 located at the front end as deployed, thus fed with an inflation gas from the principal inflatable section 17 via the communication region 31 (FIGS. 7 and 8). The protruding inflatable section 30 includes an upper wall 30*a* and a lower wall 30*b* extending generally along a left and right direction on the upper and lower sides, a left side wall 30*c* and a right side wall 30*d* extending generally along a front and rear direction at the left and right sides, and a rear side wall 30*e* extending generally along an up and down direction at the rear. In the illustrated embodiment, the left side wall 30*c* is continuous with the left side wall 18*c* of the circumferential wall 18 of the principal inflatable section 17, as shown in FIG. 8. More particularly, as shown in FIGS. 4, 5, 7 and 8, the protruding inflatable section 30 is uniform in width in a left and right direction but narrows toward the rear side wall 30*e* in width in and up and down direction. To this end, the upper wall 30*a* extends downwardly towards the rear while the lower wall 30*b* extends generally along a front and rear direction.

As shown in FIGS. 8 and 12, in a horizontal sectional view of the airbag 15 as deployed, the protruding inflatable section 30 is formed at an area of the airbag 15 on the left side of the center line CL which runs through the mounting center C in a front and rear direction (in other words, at an area disposed towards the driver's seat DS). More specifically, as viewed from an up and down direction (or in a horizontal sectional view), the protruding inflatable section 30 is designed to be deployed at an area to the left side of the left gas inlet port 21L. Thus the right side wall 30*d* of the protruding inflatable section 30 is deployed at a farther leftward position than the left gas inlet port 21L. Moreover, the protruding inflatable section 30 is disposed at the rear of the circumventing recess 26 formed on the principal inflatable section 17, i.e. in front of the space between the driver's seat DS and passenger seat PS, at the generally center of the vehicle width. Furthermore, as shown in FIG. 12, at airbag deployment, the protruding inflatable section 30 protrudes farther rearward than the airbag 106 for the steering wheel as deployed.

The bag body 16 of the illustrated embodiment includes a main bag section 33 which is deployable in front of the passenger MP sitting in the passenger seat PS and a center bag section 34 which is deployable in such a manner as to protrude towards an inboard side in the vehicle width direction (towards the left, in the illustrated embodiment) out of the main bag section 33. In the illustrated embodiment, the main bag section 33 and center bag section 34 are integral. More specifically, referring to FIG. 8, in the airbag of the illustrated embodiment, the main bag section 33 is composed of a right portion of the principal inflatable section 17 as deployed, including the mounting region 20, (i.e. a portion deployed on the right side of the protruding inflatable section 30), and the center bag section 34 is composed of a left portion of the principal inflatable section 17 as deployed (i.e. a portion deployed in front of the protruding inflatable section 30) and the protruding inflatable section 30. That is, the center bag section 34 includes the protruding inflatable section 30 which protrudes farther rearward than the rear side wall 28, which constitutes the main bag section 33, of the principal inflatable section 17. To describe further in other words, the center bag section 34 is deployed to the area beneath the rearview mirror RM in front of the space between the driver's seat DS and passenger seat PS, and includes, at its region which would otherwise be in engagement with the rearview mirror RM, the circumventing recess 26 with which the airbag 15 is prevented from engagement with the rearview mirror RM.

In the illustrated embodiment, a rear portion of the airbag 15 as deployed serves as a passenger protection region 37 which protects the front seat passenger MP. More particularly, in the illustrated embodiment, the protruding inflatable section 30, which is part of the center bag section 34, and the rear side wall 28 of the principal inflatable section 17, part of the main bag section 33, constitute the passenger protection region 37. The passenger protection region 37 includes a front-collision arresting plane 38 which protects the head MH of the passenger MP when it moves forward in the event of a frontal collision of the vehicle V, and an oblique-collision arresting plane 39 which protects the head MH of the passenger MP when it moves diagonally forward in the event of an oblique collision or an offset collision of the vehicle V. There is formed an arresting recess 40 between the front-collision arresting plane 38 and the oblique-collision arresting plane 39 for receiving and arresting the head MH of the passenger MP.

In the illustrated embodiment, the front-collision arresting plane 38 is composed of an upper area of the rear side wall 28, the rear surface of the main bag section 33 as deployed. In other words, the front-collision arresting plane 38 is composed of an area disposed on the right side of the protruding inflatable section 30 as deployed. That is, the front-collision arresting plane 38 includes an area extending farther to the left of the center line CL (i.e. towards the driver's seat DS) so as to protect the head MH of the passenger MP smoothly when it moves forward in the event of a frontal collision. As shown in FIG. 8, in the horizontal sectional view of the airbag 15 as deployed, the front-collision arresting plane 38 is slightly sunken forward on the center line CL or in a vicinity of the center in a left and right direction.

The oblique-collision arresting plane 39 is composed of the right side wall 30d of the protruding inflatable section 30 which is continuous with and rises rearward out of the rear portion of the principal inflatable section 17 (i.e. out of the rear side wall 28). The oblique-collision arresting plane 39 of the illustrated embodiment is designed to extend generally along a front and rear direction at airbag deployment. The lower region of the rear side wall 28 of the airbag 15 is to catch mainly the thorax of the passenger MP when the passenger protection region 37 arrests the head MH of the passenger MP.

The arresting recess 40 formed between the front-collision arresting plane 38 and oblique-collision arresting plane 39 is provided for catching and arresting the head MH of the passenger MP therein. In the illustrated embodiment, as shown in FIG. 4, the arresting recess 40 is formed generally along an up and down direction at the boundary of the right portion of the protruding inflatable section 30 and the rear side wall 28 of the principal inflatable section 17, in such a manner as to be sunken or recessed forward like a pocket such that the rear end is open, as shown in FIG. 8. More specifically, the arresting recess 40 is composed of a left side wall 42 and a right side wall 43 each of which has a generally rectangular contour extending in an up and down direction when viewed from a left and right direction. The arresting recess 40 is formed by joining (sewing) together upper edges, lower edges and front edges of the left side wall 42 and right side wall 43, thus having a pocket-like shape opening at the rear end. That is, the arresting recess 40 has a generally uniform width in an up and down direction from the rear end to the front end (bottom of the recess) 40a. The arresting recess 40 has such a width in an up and down direction at the rear end (at the opening 41) as to admit the passenger's head MH smoothly. More specifically, the width in an up and down direction of the opening 41 of the arresting recess 40 is approximately 400 mm, which is smaller than the width in an up and down direction of the front end portion (or root portion) of the protruding inflatable section 30. The dimension in a front and rear direction (i.e. depth) of the arresting recess 40 is approximately 50 to 100 mm, which is enough to accommodate a front region of the passenger's head MH. The center in an up and down direction of the arresting recess 40 is located slightly above the center in an up and down direction of the protruding inflatable section 30.

In the illustrated embodiment, the airbag 15 is internally provided with a recess-pulling tether 50 which is jointed to the bottom (i.e. the front end 40a) of the arresting recess 40. The recess-pulling tether 50 pulls the arresting recess 40 forward and deploys the arresting recess 40 generally along a front and rear direction at airbag deployment, as shown in FIG. 8. More specifically, pulled by the recess-pulling tether 50, the arresting recess 40 is deployed in such a manner as to be continuous with and be recessed forward from the right side wall 30d of the protruding inflatable section 30, and such that the left side wall 42 and right side wall 43 are brought into contact with each other generally wholly and thus the rear end 40b (or the opening 41) is held from gaping open.

As shown in FIGS. 3 to 8, the bag body 16 internally includes tethers 46, 50, 58 and 61. Specifically, the bag body 16 includes a front-rear tether 46 which is disposed in an area of the main bag section 33 in the principal inflatable section 17, the recess-pulling tether 50 which is disposed inside the principal inflatable section 17 for pulling the arresting recess 40 as described above, a left-right tether 58 which is disposed inside the protruding inflatable section 30 and a regulating tether 61 which is disposed in front of the protruding inflatable section 30 inside the principal inflatable section 17 (i.e. in an area of the center bag section 34).

As shown in FIGS. 6 and 8, the front-rear tether 46 is designed to be deployed on the center line CL which passes through the mounting center C and extends along a front and rear direction in the main bag section 33. The front-rear tether 46 is formed by jointing a front section 47 extending from the periphery of the gas inlet port 21 and a rear section 48 extending from the rear side wall 28.

Figure 9:
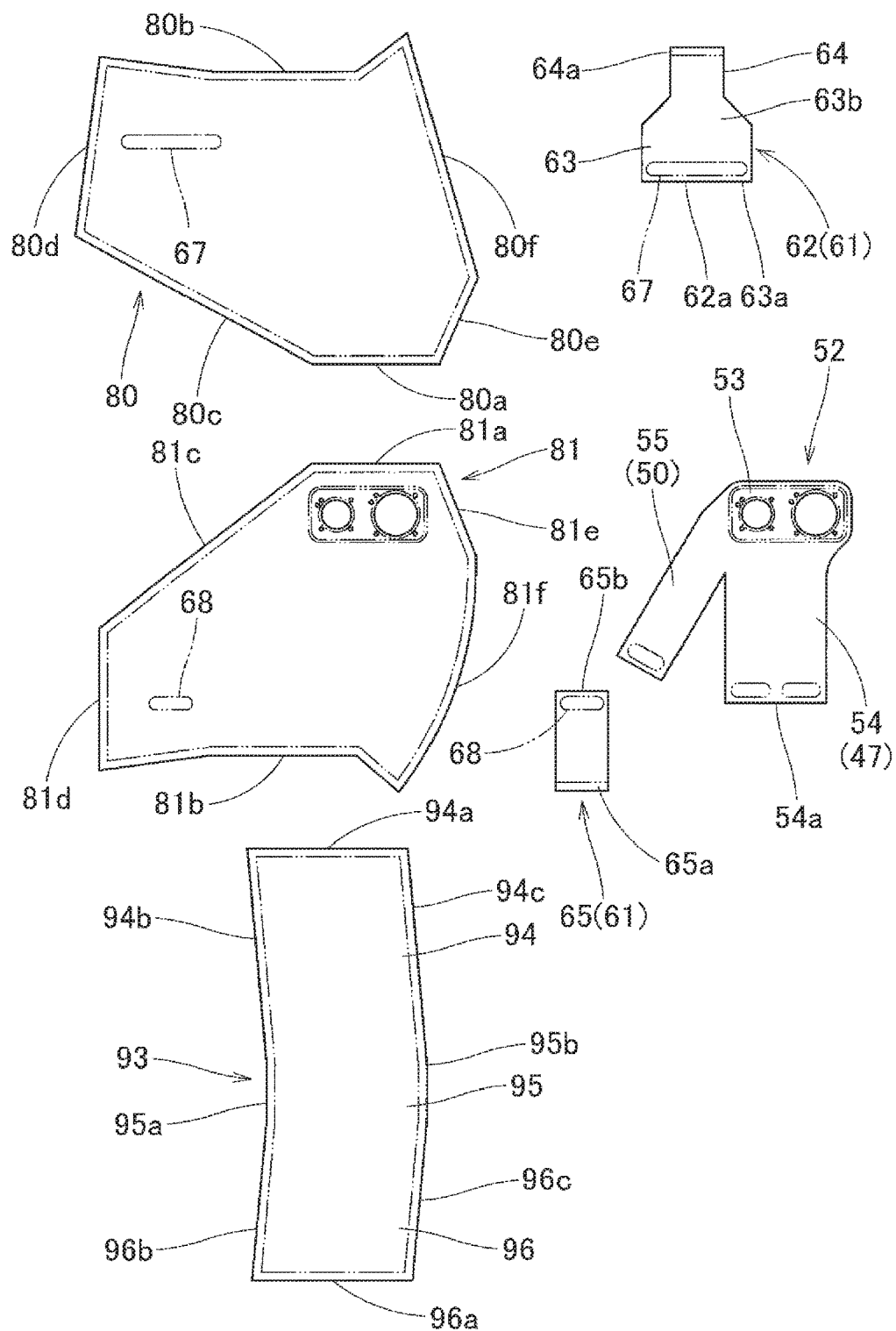
FIGS. 9 and 10 depict base materials of the airbag of FIG. 3 by plan views.

The front section 47 is formed by folding a front portion 54 of a base material 52 shown in FIG. 9 into a bilaterally symmetric shape deployable in such a three dimensional shape approximate to a generally triangular pyramid that the front end extends generally in a left and right direction and the rear end extends generally in an up and down direction. More specifically, as shown in FIGS. 6 and 8, the base material 52 has a joint region 53 at the front end, and the joint region 53 is jointed to an inner surface of the mounting region 20 of the principal inflatable section 17, at the circumference of the gas inlet ports 21. The front portion 54 of the base material 52 extends rearward from the joint region 53 and constitutes a main region 47a of the front section 47. The main region 47a is sewn to the front end 48a of the rear section 48 by the rear end 47b, and a width in an up and down direction of the rear end 47b is generally identical to a width in an up and down direction of the front end 48a of the rear section 48.

Figure 10:
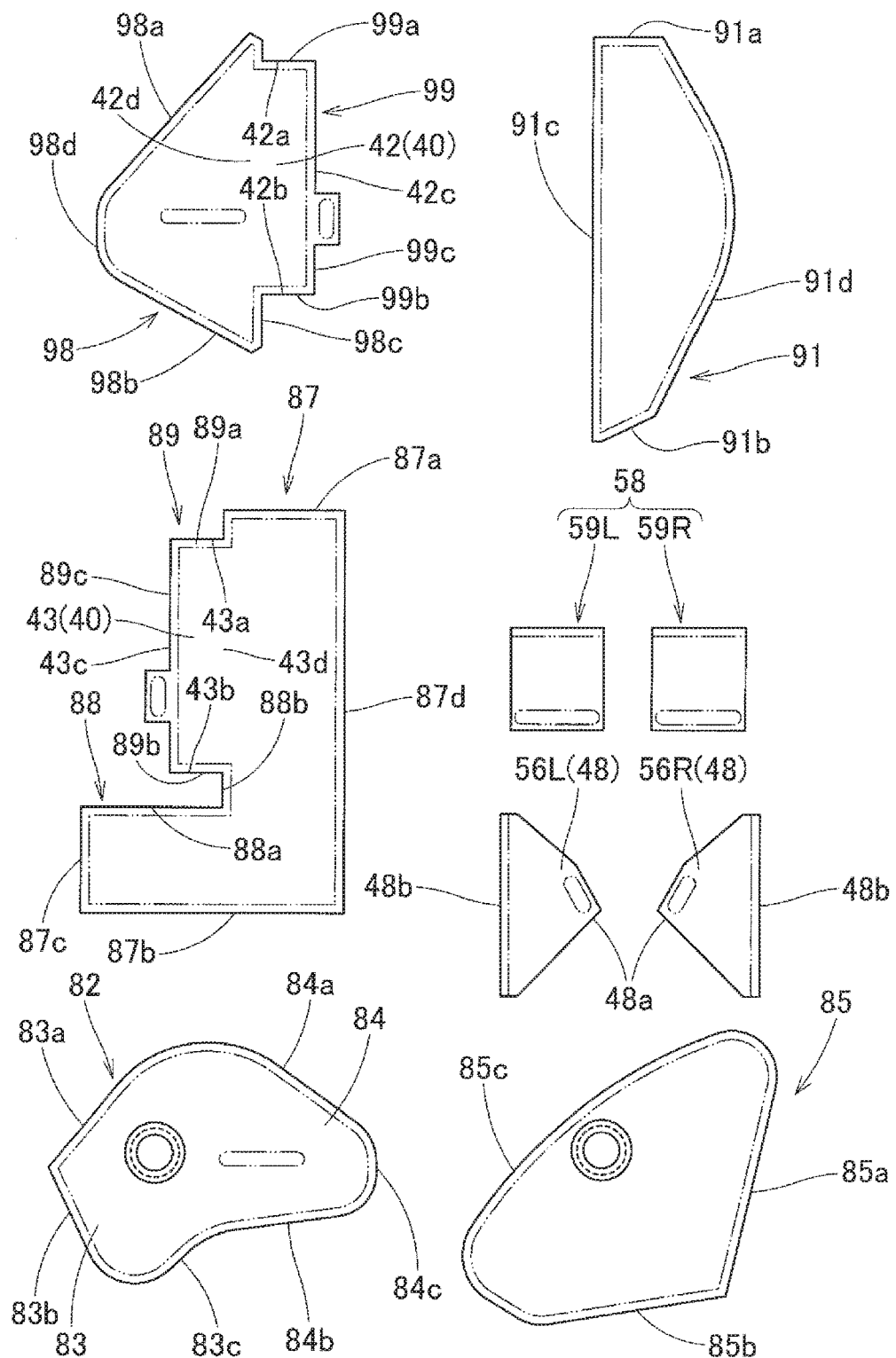

The rear section 48 is designed to extend forward from a region of the rear side wall 28 intersecting with the center line CL at airbag deployment. The rear section 48 of the illustrated embodiment is formed into a multiwall of generally trapezoidal base materials 56L and 56R (FIG. 10). More specifically, the base materials 56L and 56R are jointed to the rear side wall 28 by being each sewn to the inner circumferential edges (87d and 91c) of rear left panel 87 and rear right panel 91 (FIG. 10), when the rear left panel 87 and rear right panel 91 are sewn together by the inner circumferential edges 87c and 91c to form the rear side wall 28 of the principal inflatable section 17, as shown in FIGS. 6 and 8. The rear section 48 (i.e. the base materials 56L and 56R) has such a shape that enlarges toward the rear end 48b in an up and down direction from the front end 48a jointed to the front section 47.

The front-rear tether 46 is provided for limiting a clearance between the periphery of the gas inlet port 21 and a generally center in a left and right direction of the rear side wall 28 (i.e. of the front-collision arresting plane 38) at airbag deployment in order to prevent the rear side wall 28 from protruding unduly rearward toward the passenger MP in an initial stage of airbag deployment. As shown in FIG. 8, at airbag deployment, the front-rear tether 46 pulls and deploys the rear side wall 28 such that the region on the center line CL which passes through the mounting center C in a front and rear direction is slightly recessed forward over a generally entire area in an up and down direction.

The recess-pulling tether 50, which is disposed inside the principal inflatable section 17 for pulling the arresting recess 40, extends forward from the bottom (front end 40a) of the arresting recess 40 and connects the bottom of the arresting recess 40 and the periphery of the gas inlet ports 21, as shown in FIG. 8. The recess-pulling tether 50 of the illustrated embodiment is composed of a portion 55 of the base material 52 (FIG. 9). The portion 55 is formed generally into a band continuous with and extending rearward from the joint region 53 of the base material 52 in a flattened state. More specifically, the portion 55 extends at a slant with respect to a front and rear direction from the left end of the joint region 53 such that the rear end 55 is separated from the rear end 54a of the front portion 54. The recess-pulling tether 50 is jointed to the periphery of the gas inlet ports 21 by the front end 50 since the joint region 53 of the base material 52 is jointed to the periphery of the gas inlet ports 21. As shown in FIG. 4, at airbag deployment, the recess-pulling tether 50 is twisted in a vicinity of the joint region 53 and is deployed such that the rear end 50b jointed to the front end (bottom) 40a of the arresting recess 40 is disposed generally along an up and down direction. The recess-pulling tether 50 is deployed slightly at a slant with respect to a front and rear direction such that the front end 50a is directed towards the right, as shown in FIG. 8. The recess-pulling tether 50 has such a length as to deploy the arresting recess 40 in such a fashion that the left side wall 42 and right side wall 43 of the arresting recess 40 are brought into contact with each other generally wholly and the rear end 40b (or the opening 41) is held from gaping open, when pulling the bottom of front end 40a of the arresting recess 40 forward.

As shown in FIGS. 4, 7 and 8, the left-right tether 58 is disposed generally along a left and right direction inside the protruding inflatable section 30 and connects the left side wall 30c and right side wall 30d of the protruding inflatable section 30. The left-right tether 58 of the illustrated embodiment is disposed such that the width direction extends generally along a front and rear direction. More specifically, the left-right tether 58 is disposed slightly below the center in an up and down direction of the protruding inflatable section 30 as inflated, in an area the protruding inflatable section 30 has a greatest width in a front and rear direction. The width in a front and rear direction of the left-right tether 58 is approximately three fifths of the area that the protruding inflatable section 30 has the greatest width in a front and rear direction. The left-right tether 58 is so disposed that the front end 58a is located proximate to the front end of the protruding inflatable section 30, as shown in FIGS. 7 and 8. The left-right tether 58 of the illustrated embodiment is composed by joining together two base cloths 59L and 59R disposed side by side in a left and right direction.

The regulating tether 61, which is disposed inside the principal inflatable section 17 in front of the protruding inflatable section 30 (specifically, in the center bag section 34), is provided in order to form the circumventing recess 26 on the upper portion of the center bag section 34 (i.e. the principal inflatable section 17). In order to avoid contact between the airbag 15 as deployed and the rearview mirror RM, the regulating tether 61 connects a region of the upper portion of the airbag 15 which will be opposed to the rearview mirror RM in an up and down direction and a region of the lower portion of the airbag 15 which will be deployed below the region of the upper portion, as shown in FIG. 11. In the illustrated embodiment, the upper end 61a of the regulating tether 61 is jointed (sewn) to the region of the upper wall 18a of the principal inflatable section 17 which will be deployed immediately below the rearview mirror RM, and the lower end 61b of the regulating tether 61 is jointed (sewn) to the lower wall 18b of the region of the principal inflatable section 17 which will have a greatest width in an up and down direction as inflated (more particularly, to a position slightly in front of the rear edge of the lower wall 18b, in the illustrated embodiment). As shown in FIGS. 7 and 11, the regulating tether 61 is designed to be deployed slightly at a slant with respect to an up and down direction such that the lower end 61b is located slightly farther rearward than the upper end 61a. Even more specifically, as shown in FIG. 8, the regulating tether 61 of the illustrated embodiment is disposed at a position slightly farther forward than the bottom (front end 40a) of the arresting recess 40 of the passenger protection region 37 and on the left side of the arresting recess 40. The regulating tether 61 of the illustrated embodiment is formed into a band whose width direction generally coincides with the width direction (i.e. along a left and right direction) of the rearview mirror RM, and is composed by joining together an upper section 62 extending from the upper wall 18a and a lower section 65 extending from the lower wall 18b, as shown in FIGS. 5 and 7.

As shown in FIG. 5, the upper section 62 is formed into such a shape that has a wide width at the upper end 62a and narrows towards the lower section 65. The upper section 62 includes a joint region 63 which is disposed towards the upper end 62a and jointed to the upper wall 18a and a main body 64 extending downwardly from the joint region 63. The joint region 63 is formed into a generally trapezoid which has a wide width at the upper edge 63a and narrows in width towards the lower edge 63b. The width of the upper edge 63a region is generally identical to that of the rearview mirror RM, as shown in FIG. 5. In the illustrated embodiment, the width of the upper edge 63a region of the joint region 63 is generally identical to the width in a left and right direction of the protruding inflatable section 30. The main body 64 is formed generally into a band which extends downwardly from the lower edge 63b of the joint region 63 and has a generally same width as the lower edge 63b region of the joint region 63. The lower section 65 is formed generally into a band which has a generally same width as the main body 64 of the upper section 62, and is sewn (or jointed) to the lower end 64a of the main body 64 by the upper end 65a. The regulating tether 61 has an upper joint 67 by which the upper edge 63a of the joint region 63 in the upper section 62 is jointed to the upper wall 18a and a lower joint 68 by which the lower end 65b of the lower section 65 is jointed to the lower wall 18b. The distance between the upper joint 67 and lower joint 68 (i.e. the length of the regulating tether 61) is smaller than a distance between the upper joint 67 and lower joint 68 of the center bag section 34 as inflated by itself (i.e., as inflated under the condition that the airbag 15 is not mounted on the vehicle V). In other words, the length of the regulating tether 61 is smaller than a width in an up and down direction of the center bag section 34 as inflated by itself. More specifically, the length in an up and down direction of the regulating tether 61 of the illustrated embodiment is approximately a half of the width in an up and down direction of the center bag section 34 as inflated by itself (i.e. under the condition that the airbag 15 is not mounted on the vehicle V). At airbag deployment, pulled by the regulating tether 61, a region of the lower wall 18b disposed below the regulating tether 61 (i.e. a region of the lower wall 18b in the periphery of the lower joint 68 of the regulating tether 61) is also sunken upward as shown in FIGS. 5 and 7. More particularly, the regulating tether 61 is designed to make the upper portion and lower portion of the airbag 15 recessed to the generally same degree and be disposed at an intermediate position in an up and down direction of the bag body 16.

The bag body 16 is formed by sewing together circumferential edges of predetermined shaped base cloths. In the illustrated embodiment, as shown in FIGS. 9 and 10, the bag body 16 is composed of eight base cloths; an upper panel 80 deployable on the upper side, a lower panel 81 deployable on the lower side, a left panel 82 deployable on the left side, a right panel 85 deployable on the right side, a rear left panel 87 and a rear right panel 91 which are deployable on the rear side, a protruding-section main panel 93 which constitutes the upper region, the rear region and the lower region of the protruding inflatable section 30, and a protruding-section right panel 98 which constitutes the right region of the protruding inflatable section 30.

The upper panel 80 forms the upper wall 18a of the principal inflatable section 17 and an upper front area of the left side wall 18c. The lower panel 81 forms the lower wall 18b of the principal inflatable section 17 and a lower front area of the left side wall 18c. The upper panel 80 and lower panel 81 are generally identical in outer contour.

The left panel 82 forms a rear region of the left side wall 18c of the principal inflatable section 17 and the left side wall 30c of the protruding inflatable section 30. As shown in FIG. 10, the left panel 82 includes a generally triangular main body 83 for forming the rear region of the left side wall 18c and a generally trapezoidal protruding region 84 disposed at the rear upper end of the main body 83 for forming the left side wall 30c of the protruding inflatable section 30. The right panel 85 forms the right side wall 18d of the principal inflatable section 17, and is generally triangular in outer contour.

The rear left panel 87 and the rear right panel 91 each form a left half region and a right half region of the rear side wall 28 of the principal inflatable section 17 as deployed. In the illustrated embodiment, the rear left panel 87 constitutes the region of the rear side wall 28 which is disposed on the left side of the center line CL running through the mounting center C and extending generally along a front and rear direction while the rear right panel 91 forms the region of the rear side wall 28 on the right side of the center line CL (FIG.

8). The rear left panel 87 has such a contour that the left upper region is cut out for providing gas communication between the principal inflatable section 17 and protruding inflatable section 30. As shown in FIG. 10, a flap-like portion 89 is disposed in this cut-out region 88 for forming the right side wall 43 of the arresting recess 40. The flap-like portion 89 is formed into a generally rectangle elongated in an up and down direction and protrudes towards the left out of the right edge of the cut-out region 88 of the rear left panel 87 as developed flatly. More specifically, the width in an up and down direction of the flap-like portion 89 is slightly smaller than that of the cut-out region 88 (i.e., the length of the right edge of the cut-out region 88). The rear right panel 91 has a generally semielliptical shape elongated generally in an up and down direction. The rear left panel 87 and rear right panel 91 are sewn together on the inner circumferential edges (i.e. on the right edge 87d and left edge 91c) to form the rear side wall 28. The rear ends of the base materials 56L and 56R for forming the rear section 48 of the front-rear tether 46 are sewn together with the inner circumferential edges 87d and 91c of the rear left panel 87 and rear right panel 91, thus the front-rear tether 46 is jointed to the rear side wall 28.

The protruding-section main panel 93 includes an upper-wall region 94 for forming the upper wall 30a, a rear-wall region 95 for forming the rear side wall 30e, and a lower-wall region 96 for forming the lower wall 30b, of the protruding inflatable section 30 as deployed. The protruding-section main panel 93 has such a generally band-shaped outer contour that the upper-wall region 94, the rear-wall region 95 and the lower-wall region 96 are lined up.

The protruding-section right panel 98 forms the right side wall 30d of the protruding inflatable section 30 as deployed, and is formed into a generally trapezoid slightly narrowing towards the rear edge. A flap-like portion 99 for forming the left side wall 42 of the arresting recess 40 is disposed at the front edge 98c of the protruding-section right panel 98. The flap-like portion 99 is formed into a generally rectangle and protrudes out of the front edge 98c of the protruding-section right panel 98. The flap-like portion 99 is generally identical in outer contour to the flap-like portion 89 of the rear left panel 87, as shown in FIG. 10. More specifically, the width in an up and down direction of the flap-like portion 99 is slightly smaller than that of the front edge 98c of the protruding-section right panel 98, and the center in an up and down direction of the flap-like portion 99 is disposed slightly above the center in an up and down direction of the front edge 98c of the protruding-section right panel 98.

In the illustrated embodiment, components of the bag body 16, i.e., the upper panel 80, lower panel 81, left panel 82, right panel 85, rear left panel 87, rear right panel 91, protruding-section main panel 93, protruding-section right panel 98, base material 52 for forming the front section 47 of the front-rear tether 46 and recess-pulling tether 50, base materials 56L and 56R for forming the rear section 48 of the front-rear tether 46, the base cloths 59L and 59R of the left-right tether 58, the upper section 62 and lower section 65 for forming the regulating tether 61, are made of a flexible woven fabric of polyester yarn, polyamide yarn or the like.

As shown in FIGS. 3 to 8, the bag body 16 of the illustrated embodiment is formed by sewing (jointing) corresponding circumferential edges of the upper panel 80, lower panel 81, left panel 82, right panel 85, rear left panel 87, rear right panel 91, protruding-section main panel 93, and protruding-section right panel 98 together with sewing threads. More specifically, the front edge 80a, left front edge 80c and right front edge 80e of the upper panel 80 are jointed with the front edge 81*a*, left front edge 81*c* and right front edge 81*e* of the lower panel 81. The rear edge 80*b* of the upper panel 80 is jointed with the front edge 94*a* of the upper-wall region 94 of the protruding-section main panel 93, the upper edge 87*a* of the rear left panel 87 and the upper edge 91*a* of the rear right panel 91. The left rear edge 80*d* of the upper panel 80 is jointed with the upper edge 83*a* of the body region 83 of the left panel 82. The right rear edge 80*f* of the upper panel 80 is jointed with the upper edge 85*a* of the right panel 85. The rear edge 81*b* of the lower panel 81 is jointed with the lower edges 87*b* and 91*b* of the rear left panel 87 and rear right panel 91. The left rear edge 81*d* of the lower panel 81 is jointed with the lower edge 83*b* of the body region 83 of the left panel 82. The right rear edge 81*f* of the lower panel 81 is jointed with the lower edge 85*b* of the right panel 85. The rear edge 83*c* of the body region 83 of the left panel 82 is jointed with the left edge 87*c* of the rear left panel 87. The upper edge 84*a* of the protruding region 84 of the left panel 82 is jointed with the left edge 94*b* of the upper-wall region 94 of the protruding-section main panel 93, the rear edge 84*c* is jointed with the left edge 95*a* of the rear-wall region 95 of the protruding-section main panel 93, and the lower edge 84*b* is jointed with the left edge 96*b* of the lower-wall region 96. The rear edge 85*c* of the right panel 85 is jointed with the right edge 91*d* of the rear right panel 91. The right edge or inner circumferential edge 87*d* of the rear left panel 87 is jointed with the left edge or inner circumferential edge 91*c* of the rear right panel 91. As described above, the rear ends of the base materials 56L and 56R for forming the rear section 48 of the front-rear tether 46 are sewn together with the inner circumferential edges 87*d* and 91*c* of the rear left panel 87 and rear right panel 91, thus the rear section 48 of the front-rear tether 46 is jointed to the rear side wall 28. The lower edge 88*a* of the cut-out region 88 of the rear left panel 87 is jointed with the front edge 96*a* of the lower-wall region 96 of the protruding-section main panel 93. The right edge 88*b* of the cut-out region 88 of the rear left panel 87 is jointed with the front edge 98*c* of the protruding-section right panel 98. The upper edge 89*a*, lower edge 89*b* and front edge 89*c* of the flap-like portion 89 of the rear left panel 87 are each jointed with the upper edge 99*a*, lower edge 99*b* and front edge 99*c* of the flap-like portion 99 of the protruding-section right panel 98. The right edge 94*c* of the upper-wall region 94, the right edge 95*b* of the rear-wall region 95 and the right edge 96*c* of the lower-wall region 96 of the protruding-section main panel 93 are each jointed with the upper edge 98*a*, lower edge 98*b* and rear edge 98*d* of the protruding-section right panel 98.

The steering wheel 102 located in front of the driver's seat DS, which is disposed to the left of the passenger seat PS, is provided with an airbag device 105. The airbag device 105 includes an airbag 106 which is stored in a boss section 103 disposed at the center of the steering wheel 102 in an folded-up configuration, and an inflator (not shown) for feeding the airbag 106 with inflation gas. The airbag 106 is fabricated of a flexible sheet material and inflatable with an inflation gas fed from the inflator to cover the top surface (i.e., rear surface) of the steering wheel 102 entirely (FIG. 2). In a similar fashion to the inflator 8 of the airbag device M for a front passenger seat, the inflator of the airbag device 105 for a steering wheel is designed to be actuated in the event of a frontal collision, an oblique collision and an offset collision of the vehicle V.

Mounting of the airbag device M on the vehicle V is now described. Firstly, the retainers 9L and 9R are housed inside the airbag 15, and the airbag 15 is folded up to be housed in the case 12. Then a breakable wrapping sheet is wrapped around the airbag 15 for keeping the folded-up configuration. Then the airbag 15 is placed on the bottom wall 12*a* of the case 12, and the main bodies 8*a* of the inflators 8L and 8R are set in the case 12 from the lower side of the bottom wall 12*a*, such that the bolts 9*a* of the retainers 9L and 9R projecting downwardly out of the bottom wall 12*a* are put through the flanges 8*c* of the inflator 8. If then the bolts 9*a* projecting out of the flanges 8*c* of the inflators 8L and 8R are fastened with nuts 10, the airbag 15 and the inflators 8L and 8R are mounted on the bottom wall 12*a* of the case 12.

Thereafter, the circumferential wall 12*b* of the case 12 is attached to the joint wall 6*c* of the airbag cover 6 on the dashboard 1, which has been mounted on board, and the unillustrated bracket of the case 12 is secured to the vehicle body structure. Thus the airbag device M is mounted on the vehicle V.

After the airbag device M of the illustrated embodiment is mounted on the vehicle V, in the event of a frontal collision, an oblique collision or an offset collision of the vehicle V, the inflators 8 (8L, 8R) discharge an inflation gas from the gas discharge ports 8*b* to inflate the airbag 15. Then the airbag 15 pushes and opens the doors 6*a* and 6*b* of the airbag cover 6, protrudes out of the case 12 via an opening formed by the opening of the doors 6*a* and 6*b*, and is deployed upward and rearward in such a manner as to fill up a space between the top plane 2 of the dashboard 1 and the windshield 4, as indicated by double-dotted lines in FIGS. 1 and 2 and as shown in FIGS. 11, 12 and 14. At the same time, the steering wheel airbag 106 is also inflated with an inflation gas and is deployed over the top surface (i.e., rear surface) of the steering wheel 102 (FIG. 2).

Figure 13:
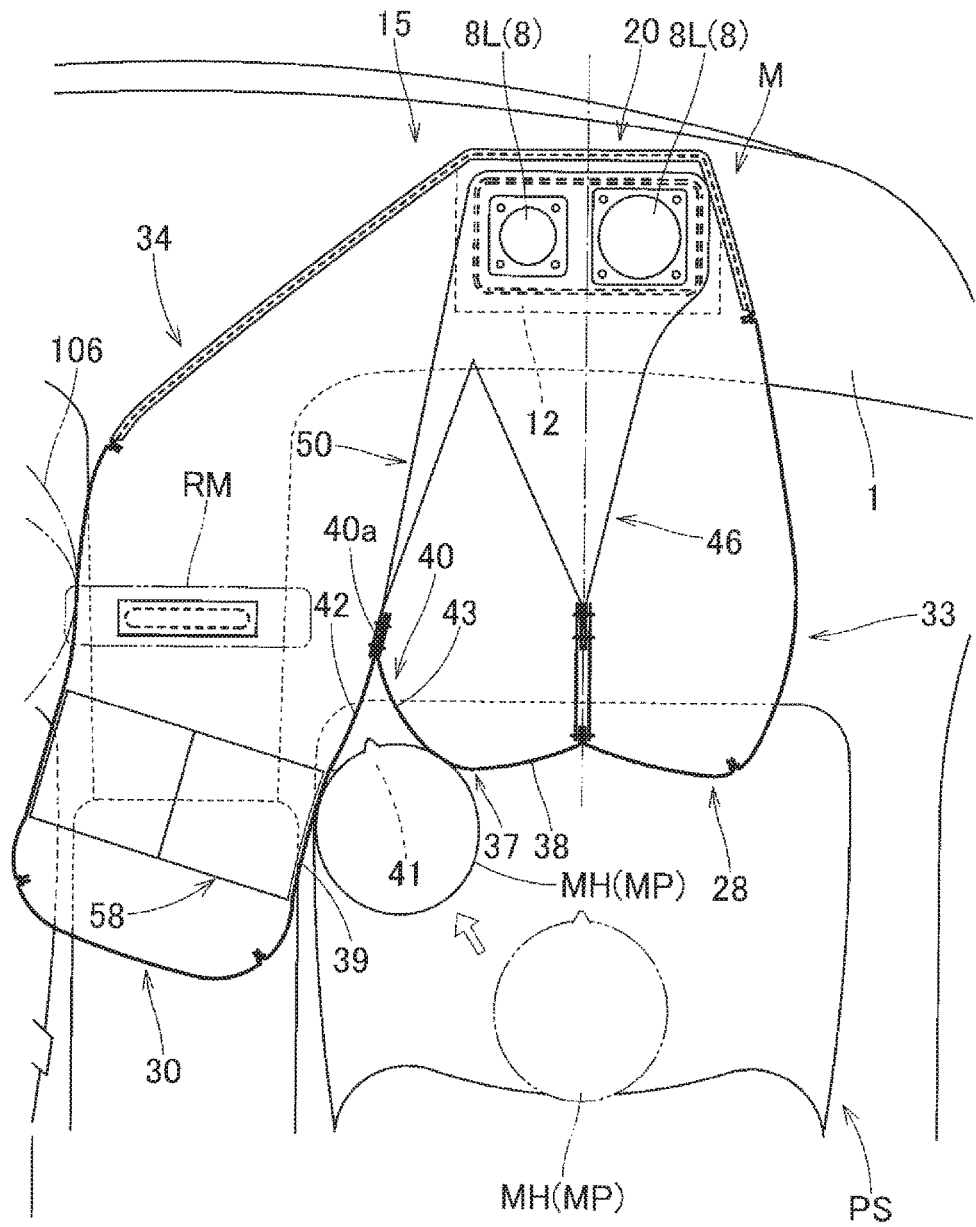
FIG. 13 is a schematic horizontal sectional view of the airbag device of FIG. 1 showing the way the airbag as deployed catches a passenger who has moved diagonally.

The airbag device M for a front passenger seat of the illustrated embodiment includes, inside the center bag section 34, the regulating tether 61 which connects the upper portion and lower portion of the center bag section 34 and holds the center bag section 34 from contacting the rearview mirror RM at airbag deployment. The regulating tether 61 will prevent the upper portion of the center bag section 34 facing the rearview mirror RM from bulging upward even when a passenger MP is thrown against the passenger protection region 37 and pushes the passenger protection region 37 forward forcefully, as shown in FIGS. 12 and 13, thus prevent engagement of the center bag section 34 with the rearview mirror RM.

Therefore, the airbag device M for a front passenger seat according to the illustrated embodiment is capable of preventing contact between the airbag 15 as deployed and the rearview mirror RM.

In the airbag device M of the foregoing embodiment, the length in an up and down direction of the regulating tether 61 (i.e. the distance between the upper joint 67 and lower joint 68) is smaller than the width in an up and down direction of the center bag section 34 as inflated by itself (i.e. as inflated under the condition that the airbag 15 is not mounted on the vehicle V). In other words, the length in an up and down direction of the regulating tether 61 is smaller than the distance between the upper joint 67 and lower joint 68 of the center bag section 34 as inflated by itself. This configuration will securely help dent the upper portion of the center bag section 34 at airbag deployment such that the center bag section 34 may not contact with the rearview mirror RM. More particularly, the length in an up and down direction of the regulating tether 61 (i.e. the distance between the upper joint 67 and lower joint 68) of the illustrated embodiment is approximately a half to three fourths of the width in an up and down direction of the center bag section 34 as inflated by itself. Accordingly, at airbag deployment, the regulating tether 61 will form the circumventing recess 26 large enough for accommodating the rearview mirror RM on the upper portion of the center bag section 34, thus prevent the center bag section 34 from contacting the rearview mirror RM.

In the airbag device M of the foregoing embodiment, moreover, the regulating tether 61 is formed into a band and disposed such that the width direction generally coincides with a width direction of the rearview mirror RM. The width of the upper end 61a region of the regulating tether 61 is generally identical to the width of the rearview mirror RM and greater than the width of the lower end 61b region of the regulating tether 61, as shown in FIGS. 3 to 5. This configuration will help dent the corresponding portion of the center bag section 34 for the width of the rearview mirror RM such that the center bag section 34 will be prevented from contacting the rearview mirror RM over a generally entire area in the width direction of the rearview mirror RM. Further, the configuration that the lower end 61b region of the regulating tether 61 is smaller in width than the upper end 61a region will help reduce the volume of the airbag 15 as folded up. Especially, the regulating tether 61 of the foregoing embodiment is formed such that only the joint region 63 formed in the upper end 62a region of the upper section 62 has a great width and the joint region 63 is formed into a trapezoid narrowing towards the lower end. In other words, the regulating tether 61 is formed with a limited surface area (or volume in a folded-up state), which will contribute to reducing the volume of the airbag 15 as folded up.

Furthermore, in the airbag device M of the foregoing embodiment, the regulating tether 61 is disposed at a position in the center bag section 34 in front of the protruding inflatable section 30, in other words, at a position farther forward than the oblique-collision arresting plane 39 which is composed of the right side wall 30d of the protruding inflatable section 30. In further other words, the regulating tether 61 is disposed at a position in the airbag 15 as deployed in front of the passenger protection region 37, and at a region of the airbag 15 which is not likely to interfere with the passenger's head MH when the passenger protection region 37 catches the passenger MP, as shown in FIG. 13. With this configuration, although the regulating tether 61 is disposed generally vertically inside the airbag 15 in such a manner as to intersect with a moving direction of the passenger's head MH, the passenger protection region 37 will protect the passenger's head MH smoothly with no fear of interference between the head MH and regulating tether 61. Especially, in the airbag device M of the illustrated embodiment, although the passenger protection region 37 includes the arresting recess 40 which is recessed forward between the front-collision arresting plane 38 and oblique-collision arresting plane 39, the regulating tether 61 will not be likely to interfere with the passenger's head MH when the head MH goes into the arresting recess 40 at airbag deployment because the regulating tether 61 is disposed slightly farther forward than the bottom (front end 40a) of the arresting recess 40 at a position to the left of the arresting recess 40, as shown in FIG. 13.

Figure 15:
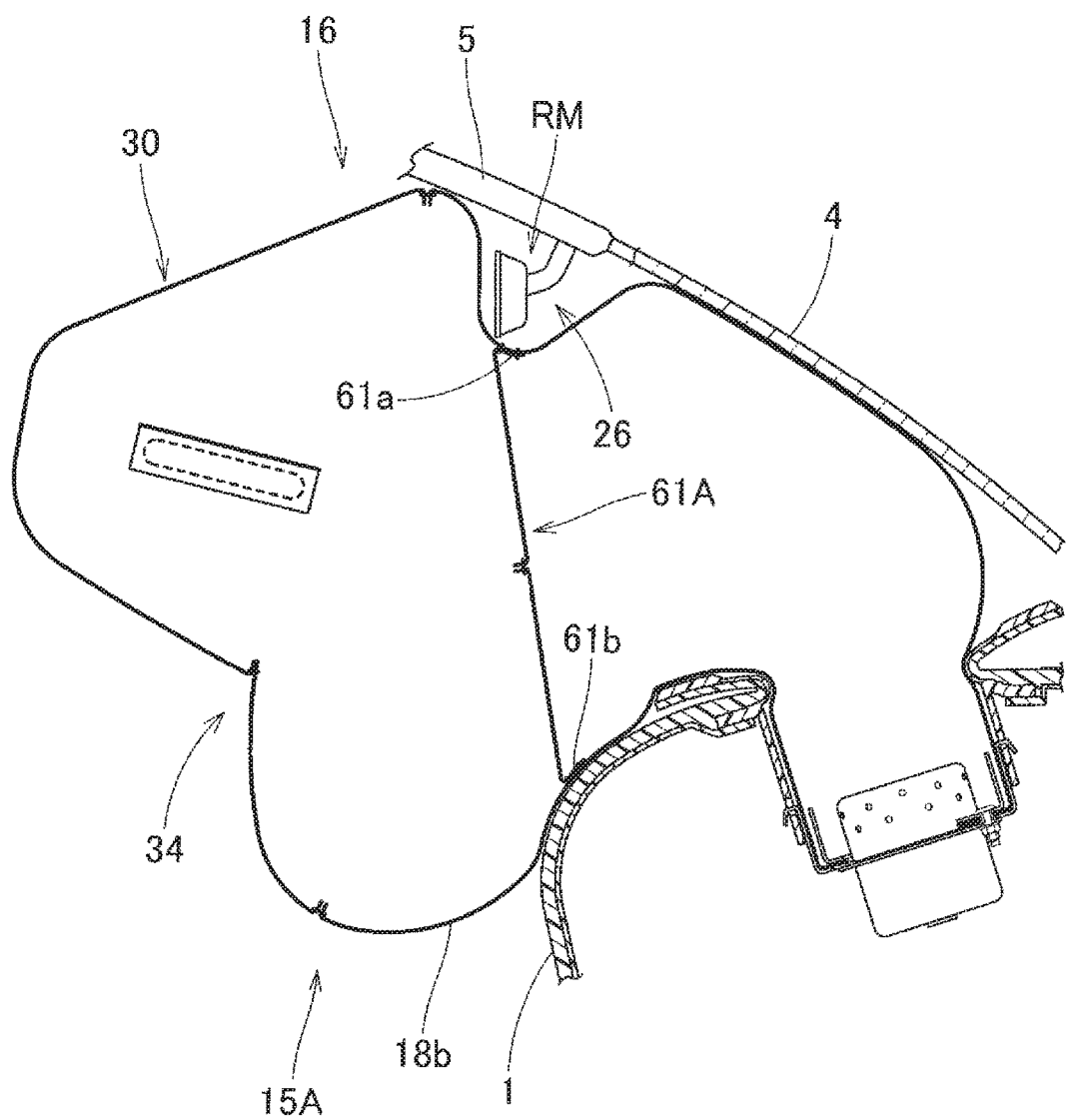
FIG. 15 is a schematic vertical section of an airbag device according to another embodiment of the invention, showing the way an airbag as fully deployed circumvents the rearview mirror.
Figure 16:
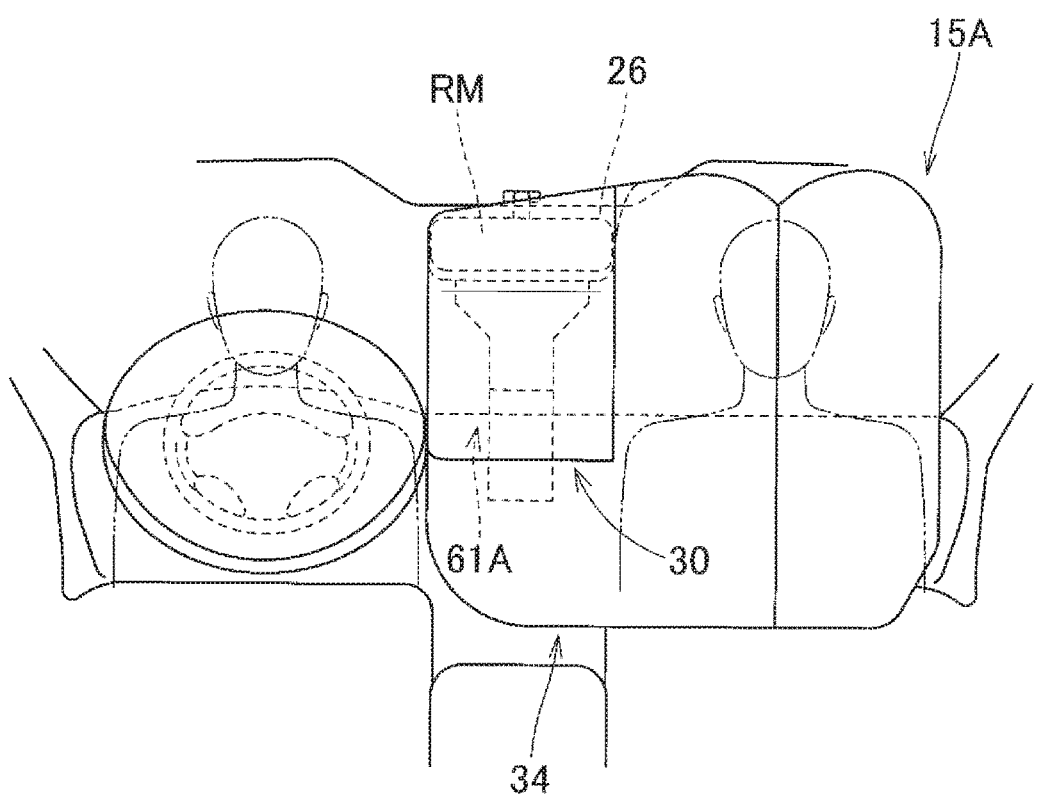
FIG. 16 is a schematic front view of the airbag device of FIG. 15 at airbag deployment.
Figure 17:
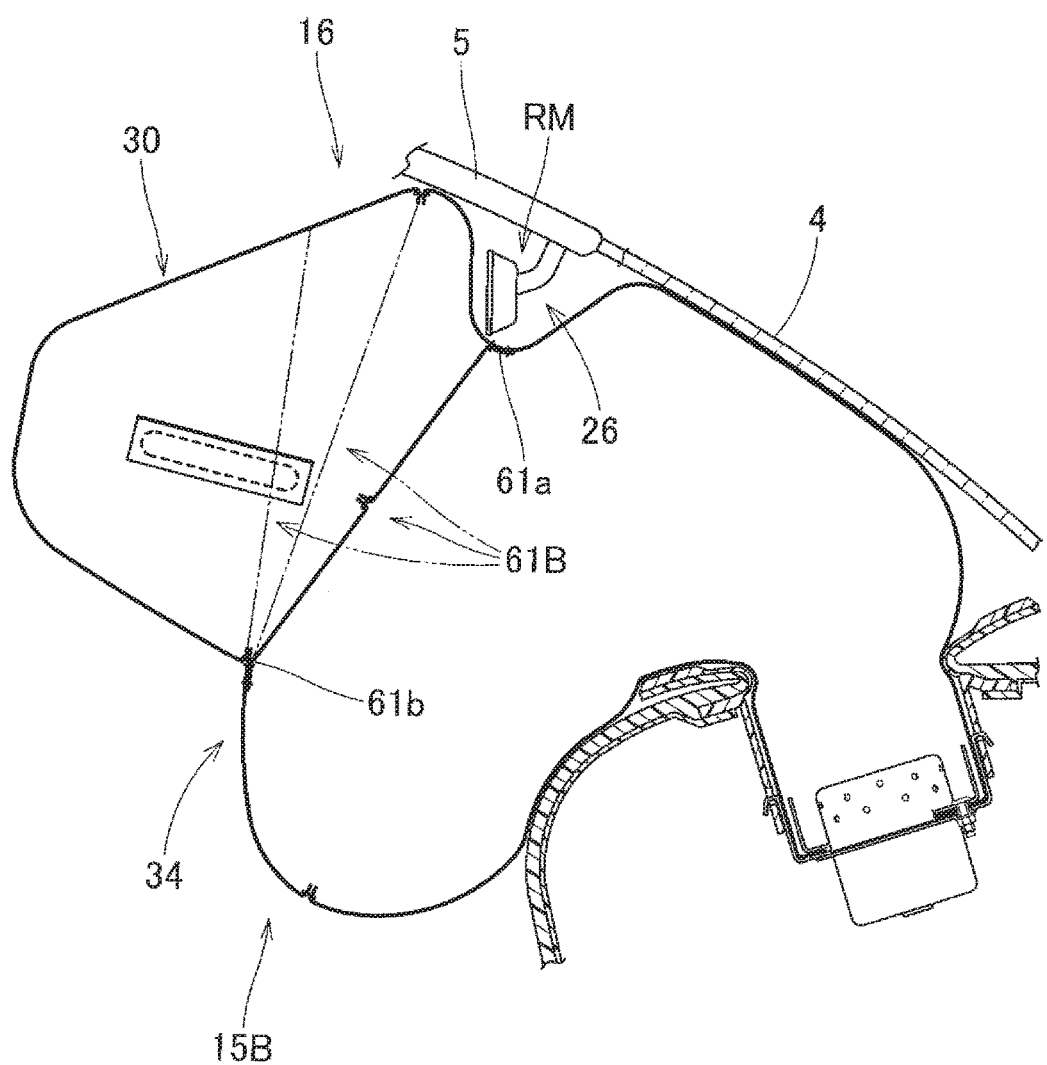
FIG. 17 is a schematic vertical section of an airbag device according to yet another embodiment of the invention, showing the way an airbag as fully deployed circumvents the rearview mirror.
Figure 18:
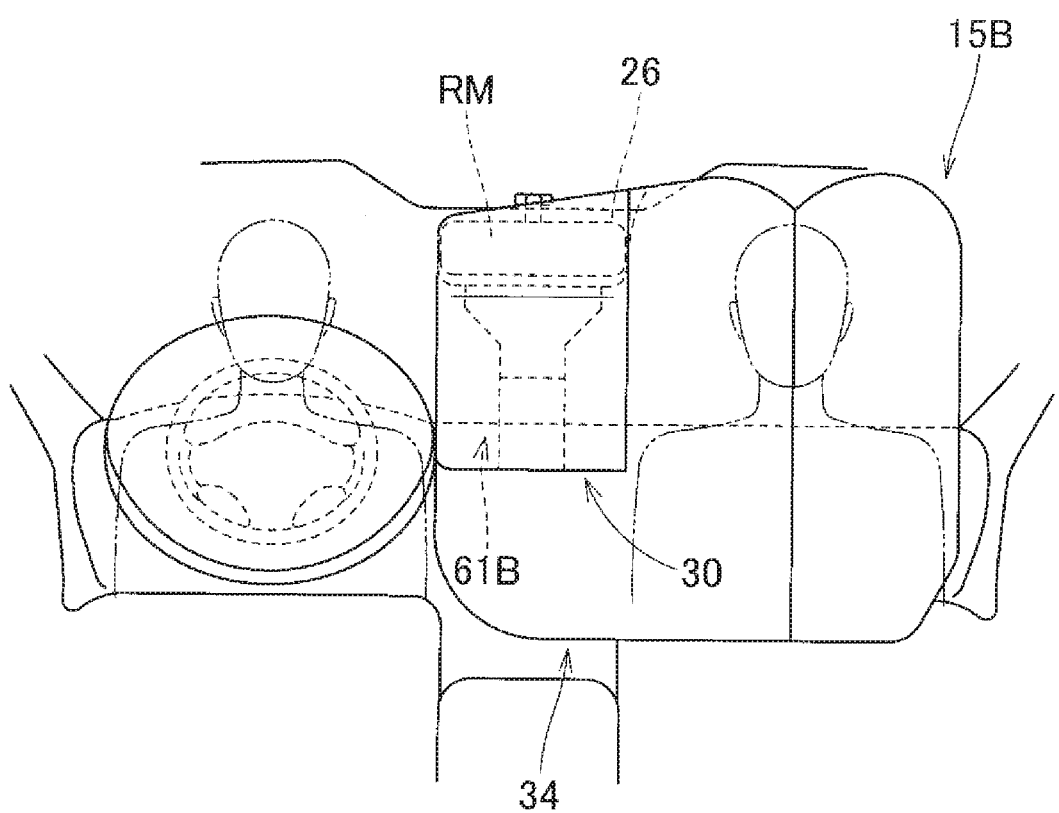
FIG. 18 is a schematic front view of the airbag device of FIG. 17 at airbag deployment.
Figure 19:
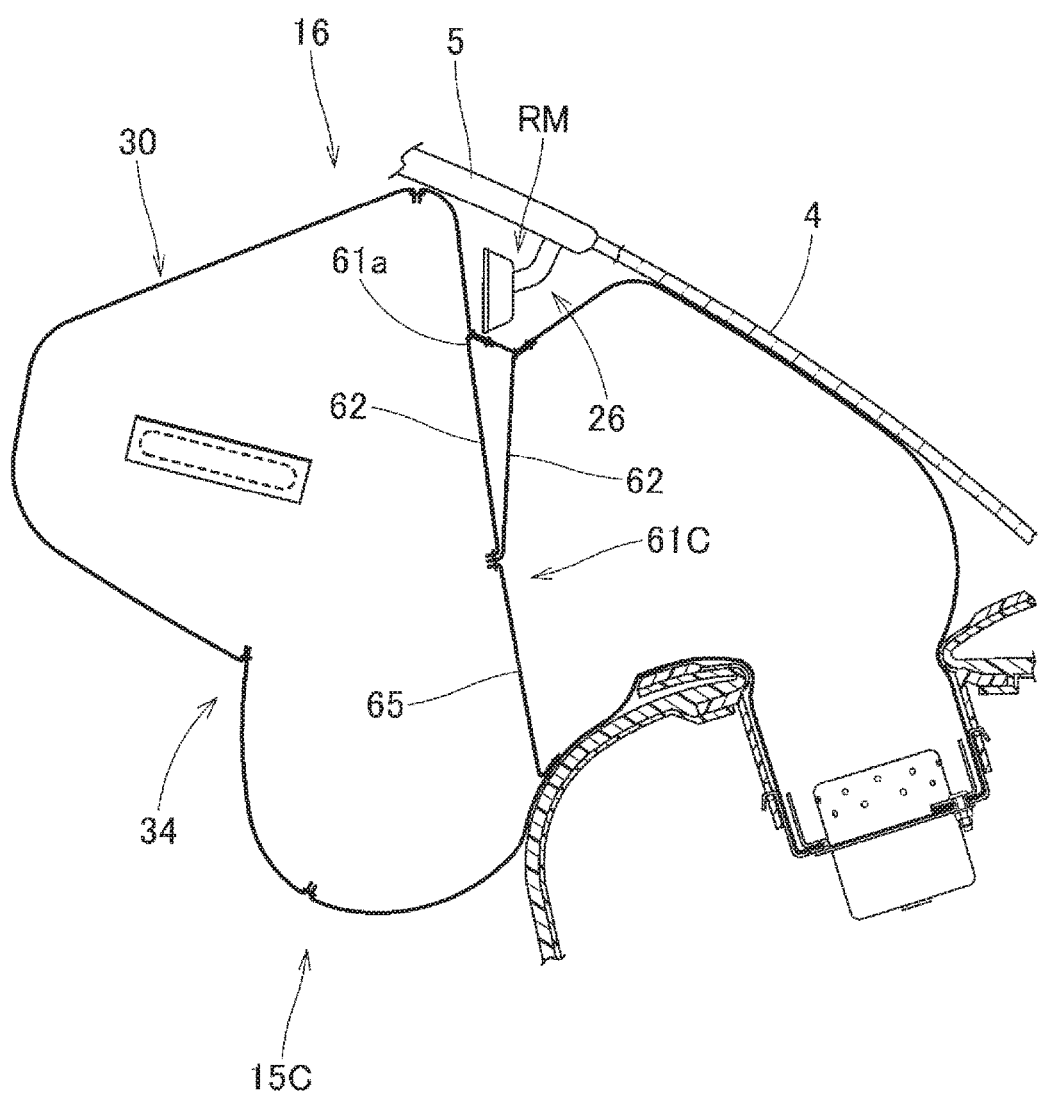
FIG. 19 is a schematic vertical section of an airbag device according to yet another embodiment of the invention, showing the way an airbag as fully deployed circumvents the rearview mirror.
Figure 20:
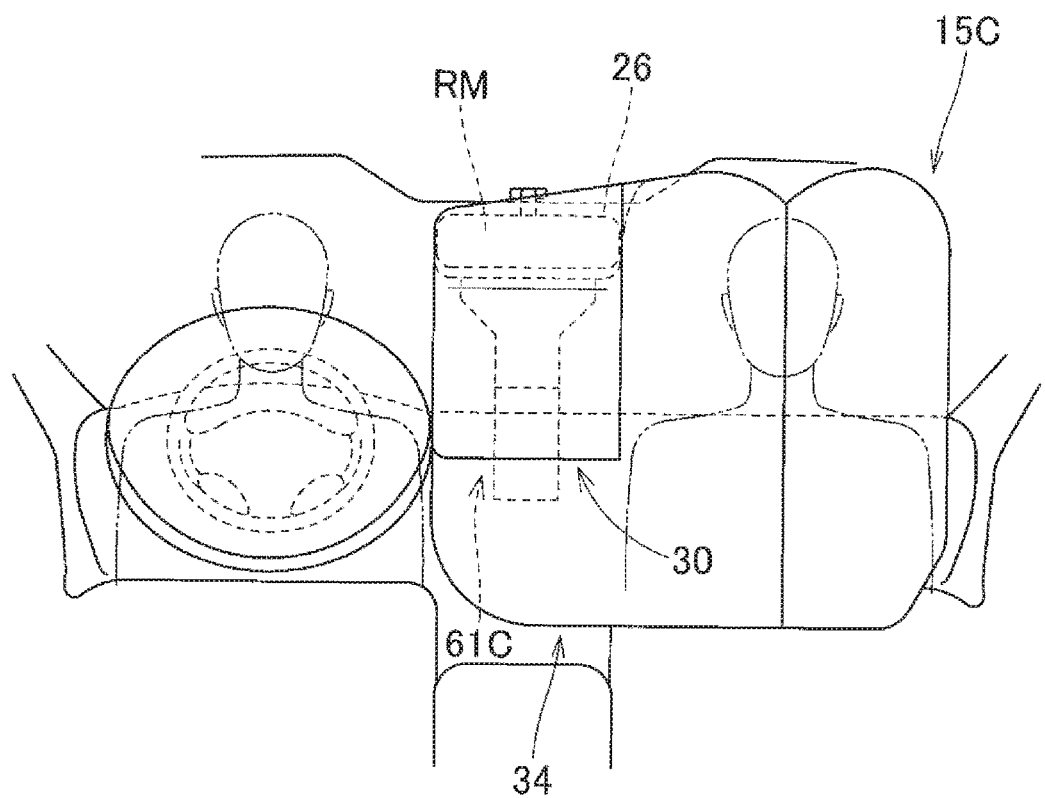
FIG. 20 is a schematic front view of the airbag device of FIG. 19 at airbag deployment.
Figure 21:
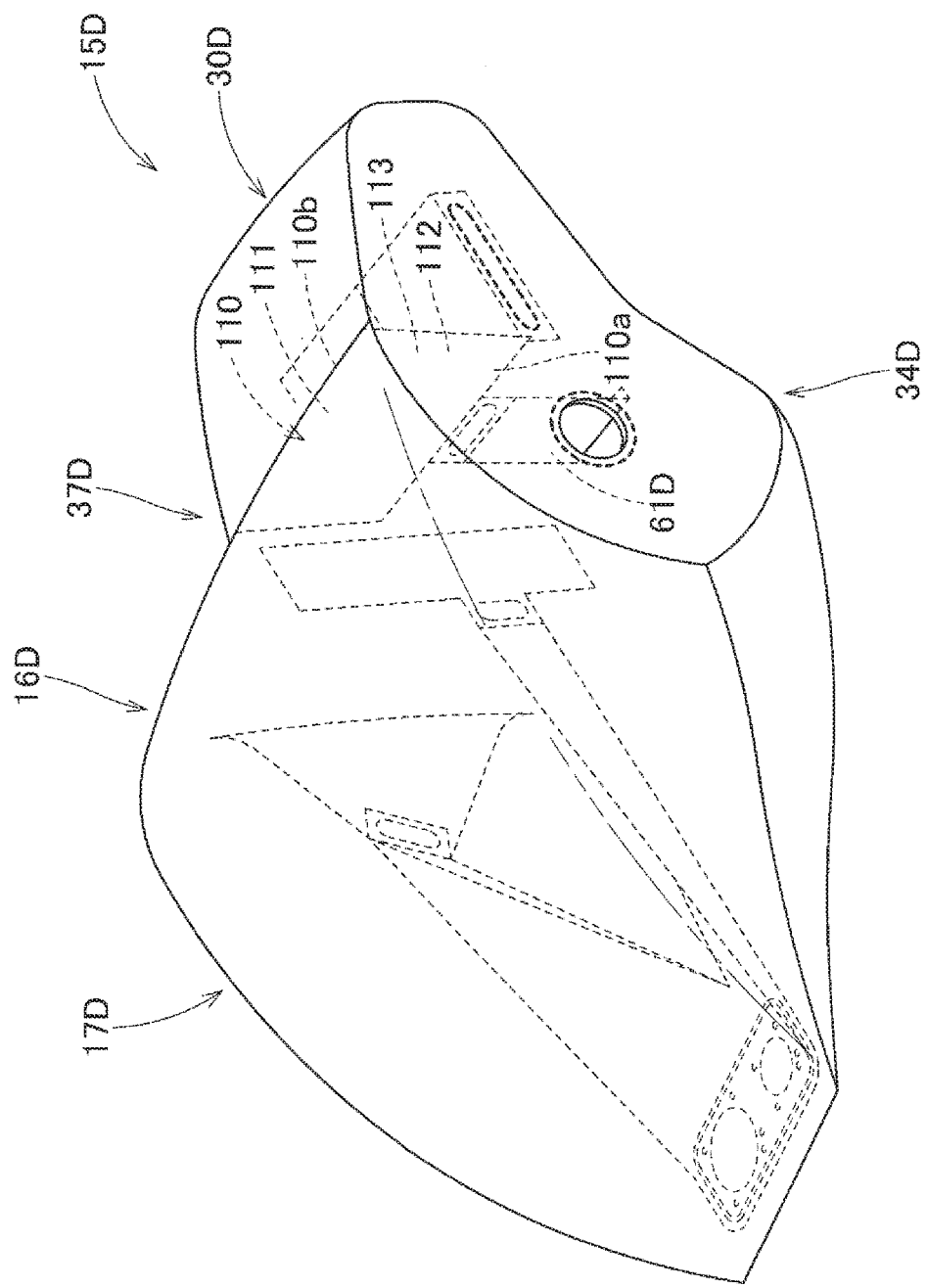
FIG. 21 is a perspective view of an airbag according to yet another embodiment of the invention as inflated by itself, viewed from left front direction.
Figure 22:
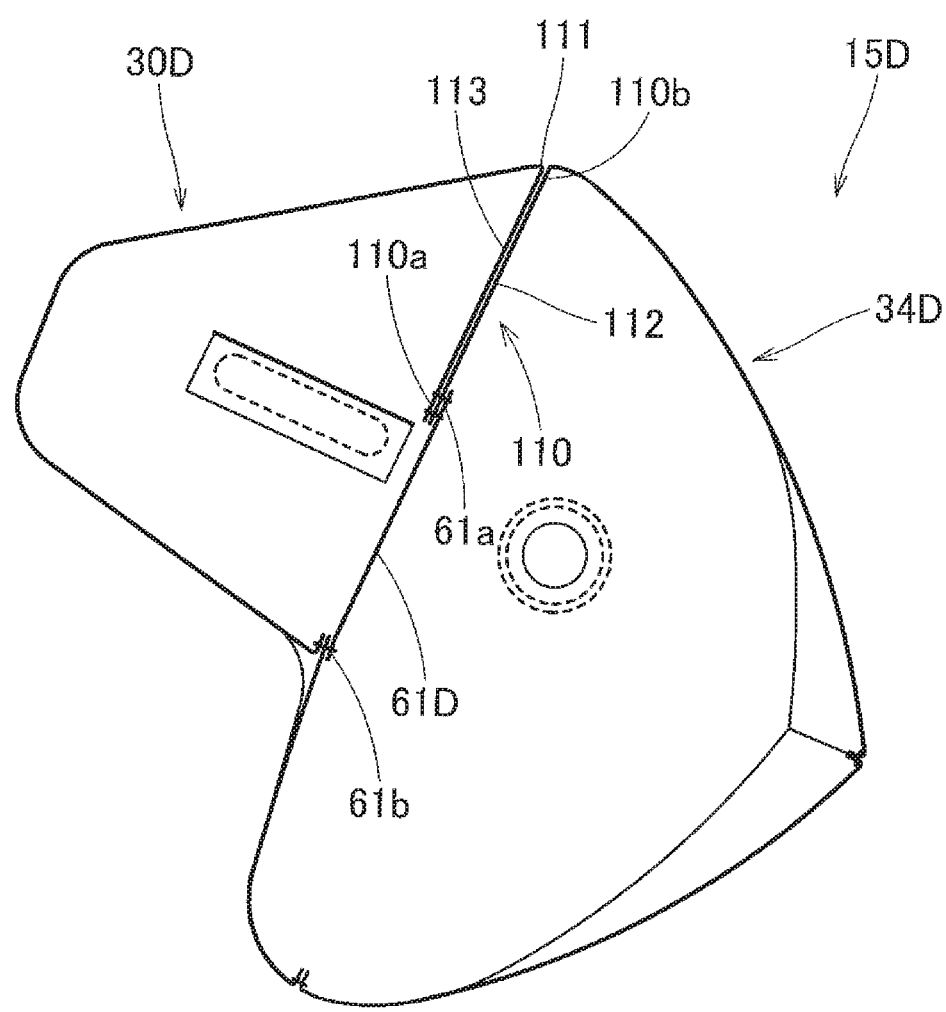
FIG. 22 is a sectional view of the airbag of FIG. 21 taken at the location of a circumventing recess and a regulating tether.

In the airbag 15 of the illustrated embodiment, the lower end 61b of the regulating tether 61 is jointed to the lower wall 18b of the region of the principal inflatable section 17 having the greatest width in an up and down direction at airbag deployment. In other words, the lower end 61b of the regulating tether 61 is jointed to the region of the principal inflatable section 17 which will be deployed at the rear of the dashboard 1 of the vehicle V and be disposed at a lowermost position of the principal inflatable section 17. The position of the joint of the regulating tether 61 to the lower wall 18b and the shape of the regulating tether 61 should not be limited to that of the illustrated embodiment, and may be alternatively formed like a regulating tether 61A in an airbag 15A depicted in FIGS. 15 and 16. The lower end 61b of the regulating tether 61A is jointed to a region of the lower wall 18b which is designed to deploy on the dashboard 1, and the regulating tether 61A is disposed so as to be deployed at a slant with respect to an up and down direction such that the lower end 61b is located farther forward than the upper end 61a as viewed from side of the airbag 15A as deployed. Further alternatively, the regulating tether may be configured like a regulating tether 61B in an airbag 15B depicted in FIGS. 17 and 18.The lower end 61b of the regulating tether 61B is jointed to a vicinity of the front edge of the lower wall 30b of a protruding inflatable section 30B (in other words, to a border of the principal inflatable section 17B and protruding inflatable section 30B) such that the regulating tether 61B will be deployed at a slant with respect to an up and down direction with the lower end 61b located farther rearward than the upper end 61a as viewed from side of the airbag 15B as deployed. Further alternatively, like an airbag 15C depicted in FIGS. 19 and 20, it is also conceivable to form an upper section 62C of the regulating tether 61C in such a manner as to bifurcate in a front and rear direction towards the upper end 61a. More specifically, the upper section 62C of the regulating tether 61C includes two sections which bifurcate from the lower section 65 towards the upper end 61a and will deploy one behind the other. At airbag deployment, this configuration will form a circumventing recess 26C over a great width in a front and rear direction and helps prevent engagement of the center bag section 34 with the rearview mirror RM further adequately. Here, although the lower end 61b of the regulating tether 61C depicted in FIGS. 19 and 20 as well as the regulating tether 61A depicted in FIGS. 15 and 16 is jointed to a region of the lower wall 18b which is designed to deploy on the dashboard 1, the bifurcate configuration of the upper section of the regulating tether described above may also be applied to the regulating tethers 61 and 61B of the airbag 15 and 15B. Further, the position of joint of the upper end 61a of the regulating tether 61B (61) to the principal inflatable section 17 can be changed suitably according to the position of the rearview mirror of the vehicle, as indicated with double-dotted lines in FIG. 17. Specifically, the upper end 61a of the regulating tether 61B (61) may be jointed to a vicinity of the front end of the protruding inflatable section 30 (i.e. to a vicinity of the border of the protruding inflatable section 30 and principal inflatable section 17), or may be jointed to an area of the protruding inflatable section 30, disposed farther rearward than the former.

A further alternative embodiment is now described referring to FIGS. 21 to 24. In an airbag 15D according to this alternative embodiment, a circumventing recess 110 is formed in a vicinity of the border of a principal inflatable section 17D and a protruding inflatable section 30D on the upper portion of a center bag section 34D as deployed, in such a manner as to be recessed downwardly relative to the peripheral region. The circumventing recess 110 is formed by joining together peripheral edges of a part each of prescribed base materials of the center bag section 34D. More specifically, the circumventing recess 110 is formed generally into a pocket opening at the root region 110 (i.e. at the upper end) by joining peripheral edges of a front wall 112 and a rear wall 113 each formed into a generally rectangle. Even more specifically, the circumventing recess 110 is formed by joining (sewing) together three sides except the upper edge (i.e. left edges, right edges and lower edges) of the front wall 102 and rear wall 113 continuously, thus having a pocket-like shape opening at the upper end. If the airbag 15D is inflated by itself, the circumventing recess 110 will be deployed such that the front wall 102 and rear wall 103 are brought into contact with each other. The circumventing recess 110 is designed to be deployed generally along the rearview mirror RM, i.e. generally along a left and right direction, in the vicinity of the border of the principal inflatable section 17D and the protruding inflatable section 30D. The width in a left and right direction of the circumventing recess 110 is generally identical with that of the protruding inflatable section 30D so as to admit the rearview mirror RM therein. More specifically, as shown in FIG. 23, an upper panel 80D and a protruding-section main panel 93D, base materials of the bag body 16D, each includes a recess-forming region 115/116 for forming the front wall 102/rear wall 103 of the circumventing recess 110. The recess-forming region 115 of the upper panel 80D is formed at the left region of the rear edge 80b region of the upper panel 80D in a protruding fashion and forms the front wall 112 of the circumventing recess 110. The recess-forming region 116 of the protruding-section main panel 93D is formed in such a manner as to protrude out of the front edge 94a of upper-wall region 94 and forms the rear wall 113 of the circumventing recess 110. The recess-forming regions 115 and 116 are formed into generally rectangular, identical contour whose width in a left and right direction is slightly greater than that in an up and down direction (or in a front and rear direction). In the airbag 15D, the regulating tether 61D connects the leading end or bottom 110a of the circumventing recess 110 and a lower portion of the center bag section 34D deployed beneath the region of the center bag section 34D facing the rearview mirror RM. In this specific embodiment, more particularly, the upper end 61a of the regulating tether 61D is jointed to the leading end or bottom 110a of the circumventing recess 110 and the lower end 61b is jointed to the front end region (i.e. to the vicinity of the border of the principal inflatable section 17D and the protruding inflatable section 30D) of the lower wall 30b of the protruding inflatable section 30D. The regulating tether 61D is composed of a piece of base material shown in FIG. 23 which is formed into a generally band shape with a generally uniform width. The length of the regulating tether 61D is such as to bring the front wall 102 and rear wall 103 of the circumventing recess 110 into contact with each other generally wholly at airbag deployment.

Figure 24:
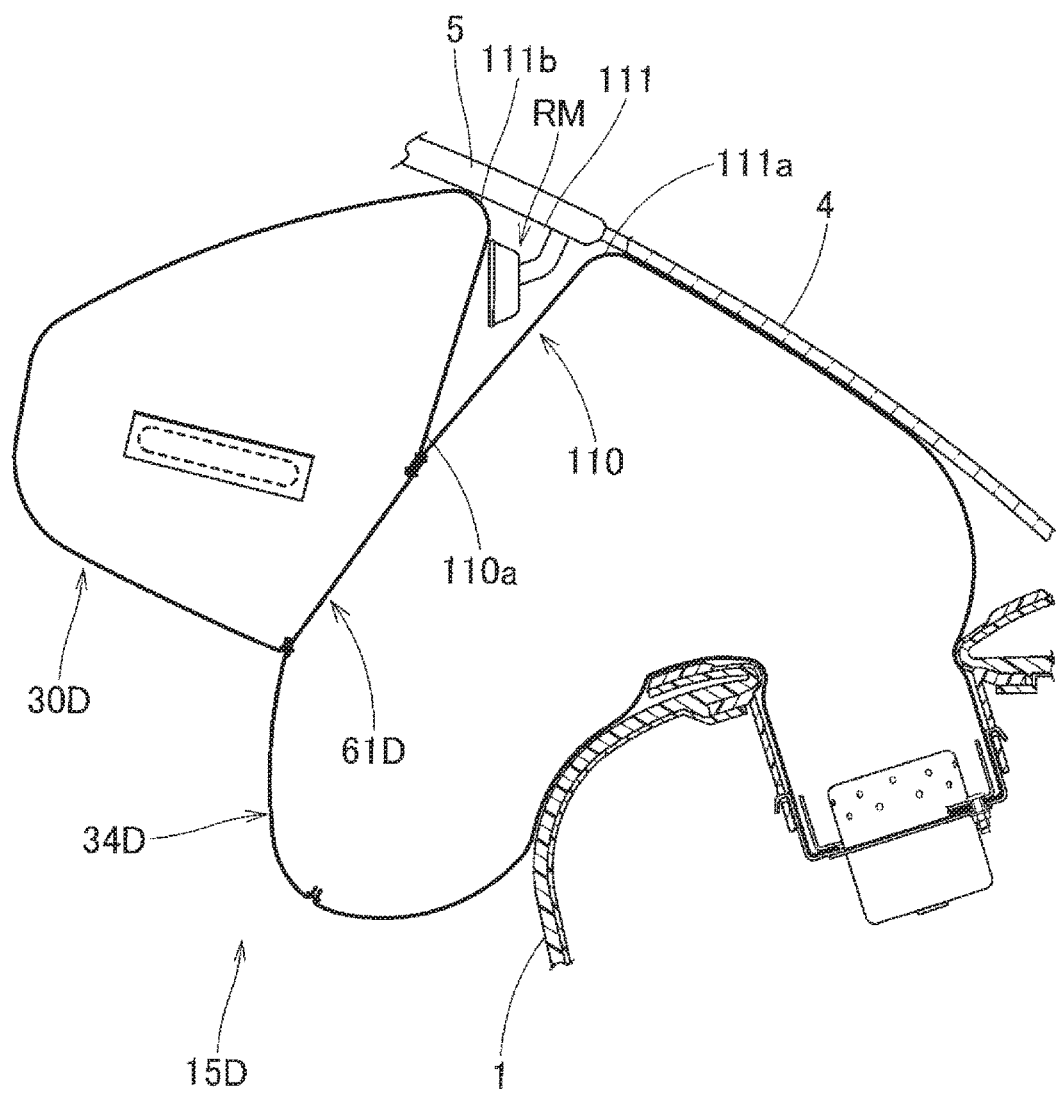
FIG. 24 is a schematic vertical section of an airbag device employing the airbag of FIG. 21, showing the way the airbag as fully deployed circumvents the rearview mirror.
Figure 25:
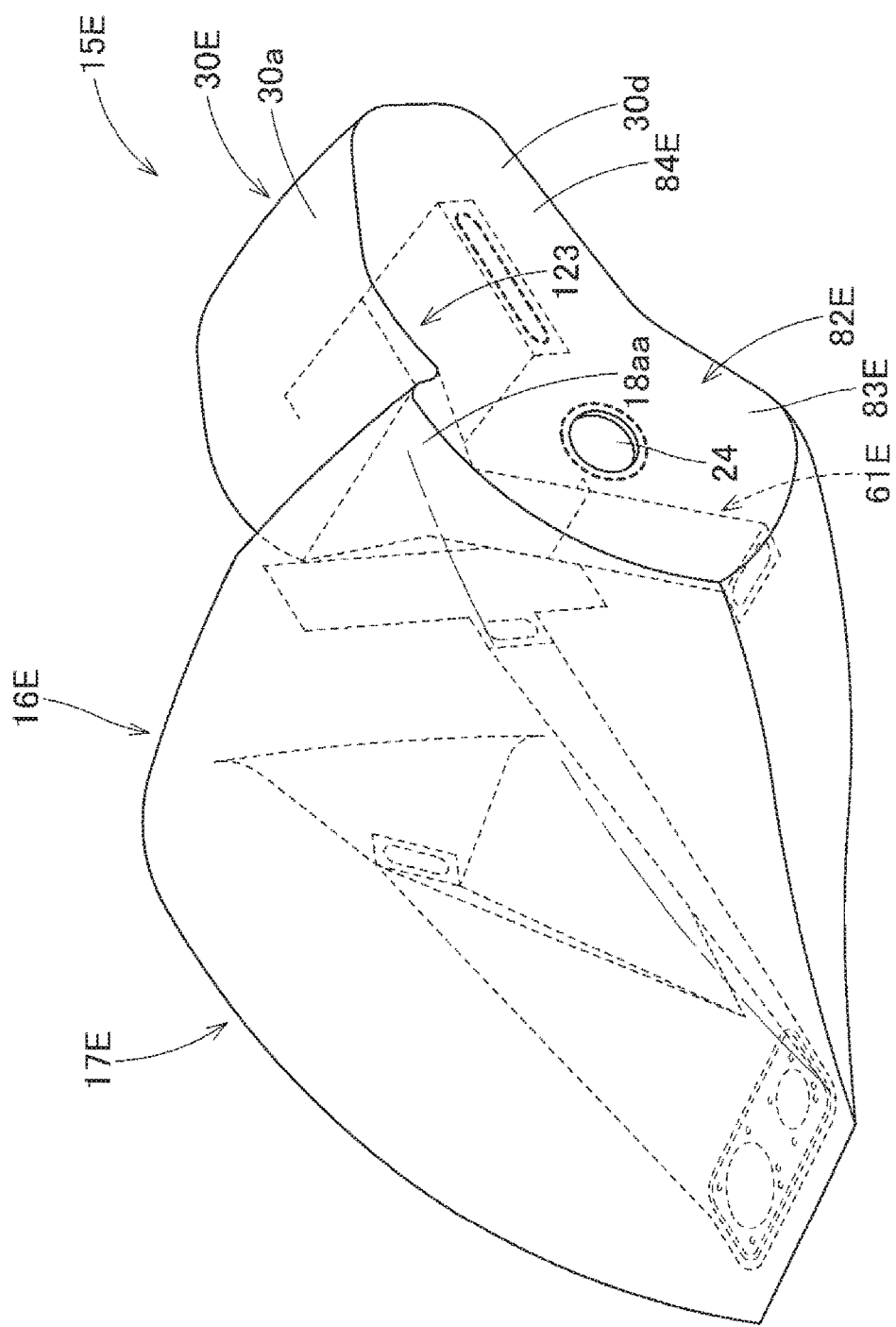
FIG. 25 is a perspective view of an airbag according to yet another embodiment of the invention as inflated by itself, viewed from left front direction.

The configuration of the airbag 15D will steadily form such a circumventing recess 110 that admits the rearview mirror RM therein at airbag deployment. In other words, this configuration will help determine the outer contour of the peripheral region of the opening 111 of the circumventing recess 110 steadily. Accordingly, when the airbag device M is mounted on board, the peripheral region (a front edge region 111a and a rear edge region 111b, FIG. 24) of the opening 111 of the circumventing recess 110 will be steadily brought into contact with the roof 5 or windshield 4 at airbag deployment, and since the airbag 15D is thus supported by the roof 5 or windshield 4, the airbag 15D will be suppressed from moving forward further when the passenger MP is thrown against the passenger protection region 37, and be able to arrest him adequately. Especially in the airbag 15D, the circumventing recess 110 is formed into a pocket-like shape by joining (sewing) together three sides except the upper edge of the front wall 112 and rear wall 113. When the rearview mirror RM is housed inside the circumventing recess 110 at airbag deployment, as shown in FIG. 24, this configuration will make the front edge region 111a and rear edge region 111b of the opening 111 of the circumventing recess 110 abut against the roof 5 or windshield 4 in front of and at the rear of the rearview mirror RM and in proximity to each other, thus preventing the opening 111 from gaping open widely in a front and rear direction. Therefore, in comparison with the airbag 15 of the foregoing embodiment, the airbag 15D will abut against and be supported by the roof 5 or windshield 4 on the upper portion over a wider area at airbag deployment.

Figure 26:
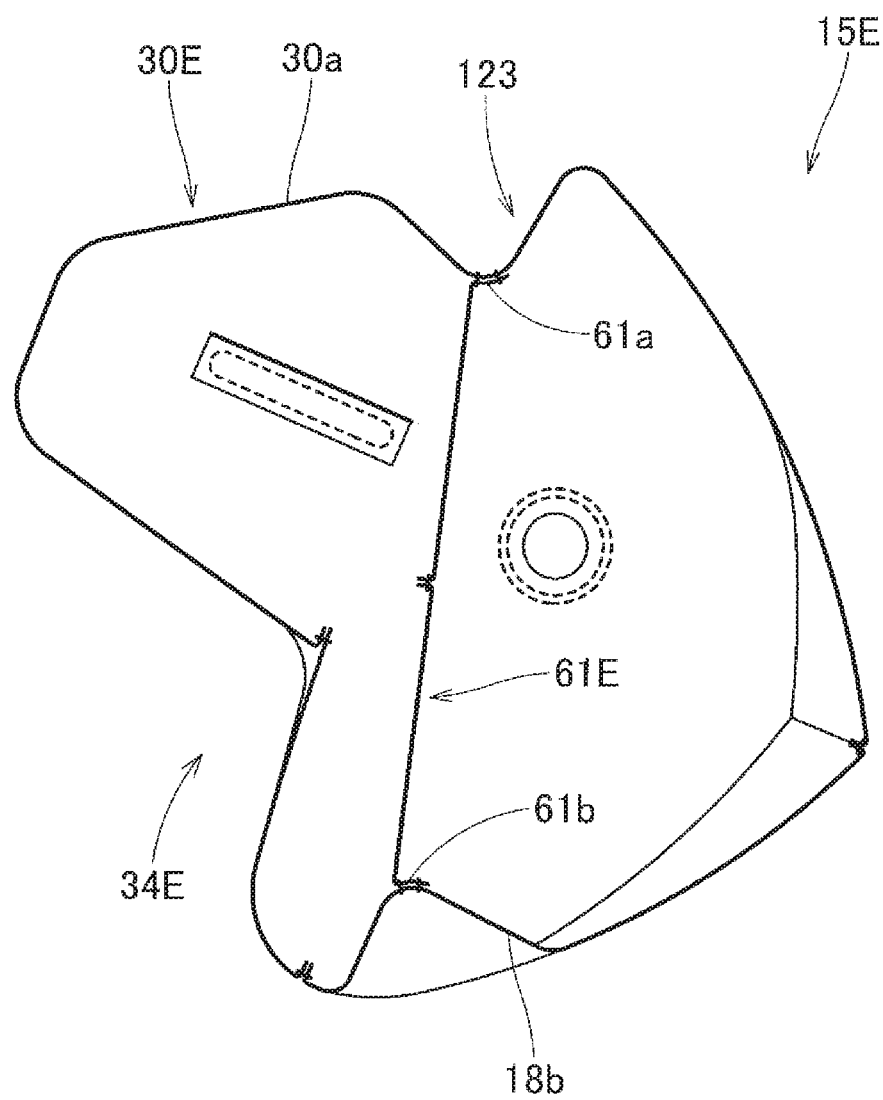
FIG. 26 is a sectional view of the airbag of FIG. 25 taken at the location of a circumventing recess and a regulating tether.
Figure 27:
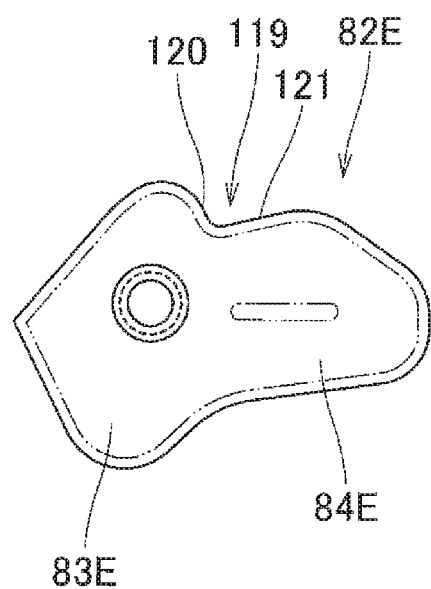
FIG. 27 is a plan view of a left panel, part of base materials of the airbag of FIG. 25.
Figure 28:
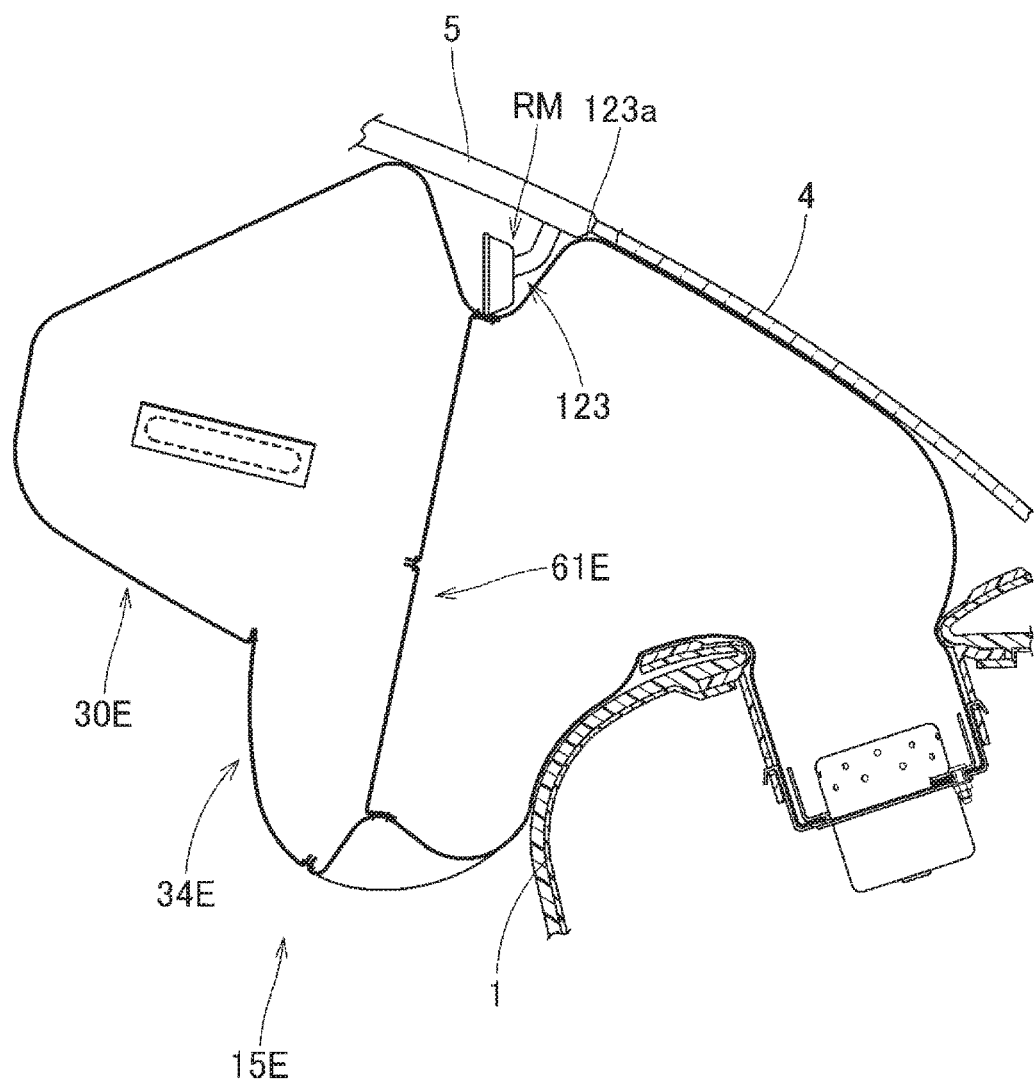
FIG. 28 is a schematic vertical section of an airbag device employing the airbag of FIG. 25, showing the way the airbag as fully deployed circumvents the rearview mirror.

Yet another alternative embodiment is now described referring to FIGS. 25 to 28. An airbag 15E of this embodiment has similar configurations to the airbag 15 except the outer contour of a left panel 82E which forms the left side wall 18c of the principal inflatable section 17E and left side wall 30c of the protruding inflatable section 30E (i.e. the left side plane of the center bag section 34E as deployed). As shown in FIG. 27, the left panel 82E is formed, including a recessed or coved portion 119 which is recessed downwardly in such a manner as to be cut out on the upper edge in a vicinity of the border of the main body 83E and the protruding region 84E. The coved portion 119 is formed into such a generally V that the front edge 120 disposed towards the main body 83E slants down rearward while the rear edge 121 disposed towards the protruding region 84E slants upward at a milder angle than the front edge 120, and that the rear end of the rear edge 121 is disposed generally at the center in a front and rear direction of the protruding region 84E. This configuration will help dent a left region of the upper portion of the center bag section 34E at airbag deployment, and the dented region will form a circumventing recess 123. The airbag 15E includes a regulating tether 61E as well inside the center bag section 34E. As shown in FIG. 26, the upper end 61a of the regulating tether 61E is jointed to a vicinity of the bottom of the circumventing recess 123 and the lower end 61b is jointed to the lower wall 18b of the region of the principal inflatable section 17E having the greatest width in an up and down direction at airbag deployment, in a similar fashion to the airbag 15. That is, since the bag body 16E itself is configured to dent to form the circumventing recess 123 on the upper portion, this configuration will determine the outer contour of the peripheral regions of the opening of the circumventing recess 123 more steadily, in comparison with an instance of the airbag 15 in which the circumventing recess 123 is formed only by pulling by the regulating tether 61. Especially in the airbag 15E, since the coved portion 119 of the left panel 82E is so formed that the front edge 120 slants at a great inclination angle with respect to a front and rear direction, the front region 123a of the peripheral region of the opening of the circumventing recess 123 will abut against the roof 5 or windshield 4 at a position proximate to and in front of the rearview mirror RM, as shown in FIG. 28.

Figure 29:
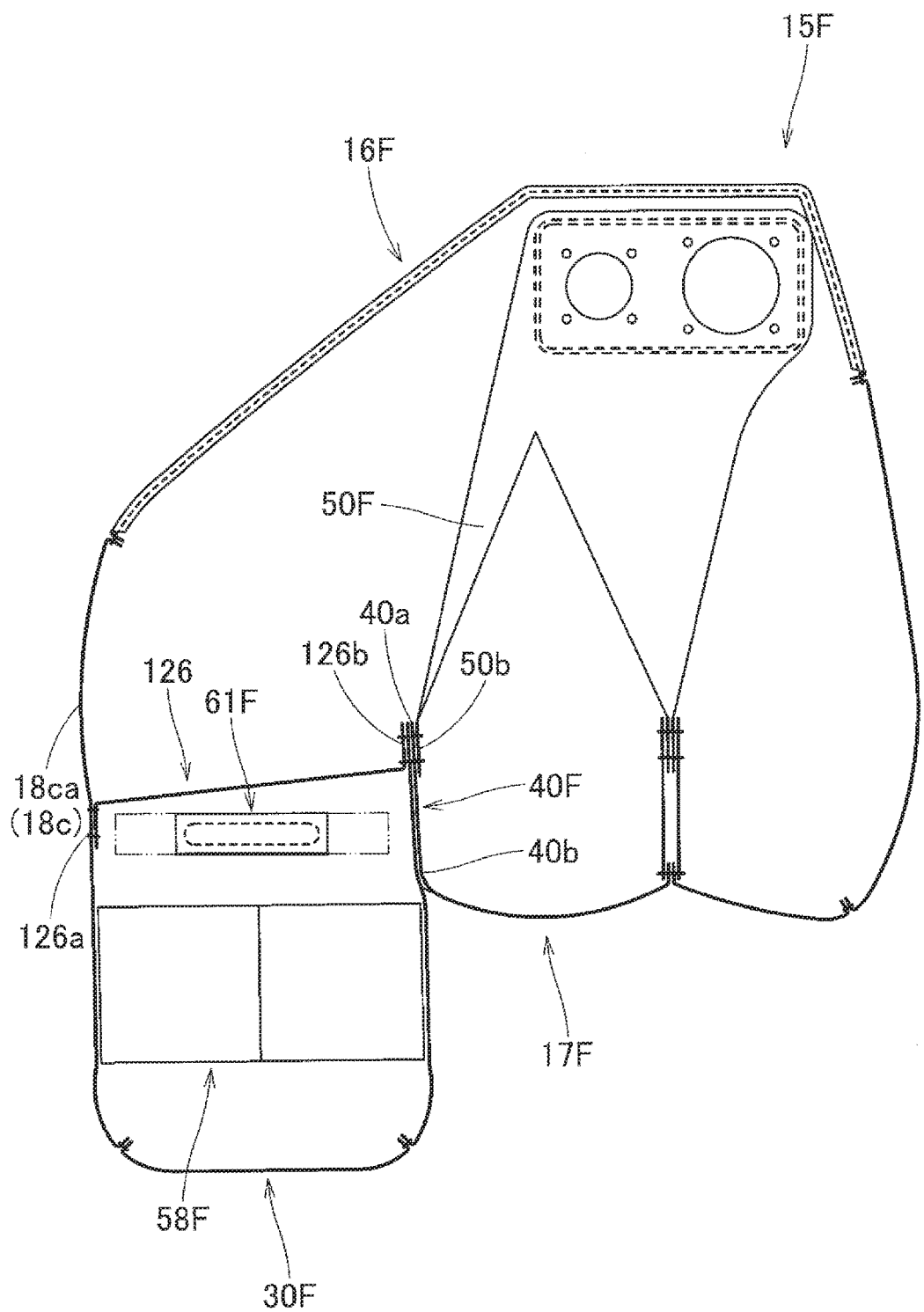
FIG. 29 is a schematic horizontal section of an airbag according to further alternative embodiment of the invention as inflated by itself.

Yet another alternative embodiment is now described referring to FIG. 29. An airbag 15F depicted in FIG. 29 includes, inside an airbag body 16F, a recess-directing tether 126 which connects the bottom (front end 40a) of the arresting recess 40F and the left side wall 18c (especially rear region 18ca) of the principal inflatable section 17F (in other words, the inboard side wall of the center bag section) for controlling deployment of the arresting recess 40F. The recess-directing tether 126 helps deploy the arresting recess 40F generally along a front and rear direction, generally along a moving direction of the passenger's head which moves diagonally forward, in combination with the recess-pulling tether 50F. The left end 126*a* of the recess-directing tether 126 is jointed to the left side wall 18*c* at a position in front of the regulating tether 61F and proximate to the rear end of the left side wall 18*c*. The right end 126*b* of the recess-directing tether 126 is jointed to the front end 40*a* of the arresting recess 40F together with the rear end 40*b* of the recess-pulling tether 50F. Thus the recess-directing tether 126 deploys generally along a left and right direction at airbag deployment. This configuration will help deploy the arresting recess 40F generally along a front and rear direction such that the front end 40*a* points to the left. The recess-directing tether 126 will also limit the width in a left and right direction of the principal inflatable section 17F at airbag deployment. When the airbag is provided with such a recess-directing tether 126, the tether 126 is preferably disposed at a farther forward region than the regulating tether 61F for forming the circumventing recess. In other words, it is preferable that the regulating tether 61F is disposed at a region between the recess-directing tether 126, the arresting recess 40F and the left-right tether 58F disposed inside the protruding inflatable section 30F.

In the airbag 15, the oblique-collision arresting plane 39 of the passenger protection region 37 is formed to rise rearward out of the front-collision arresting plane 38 at airbag deployment. However, as long as the center bag section is configured to reach an area beneath the rearview mirror at airbag deployment, the configuration of the oblique-collision arresting plane should not be limited thereby. By way of example, it will be conceivable to form the center bag section in such a manner as to be flush in the rear plane with that of the main bag section and compose the oblique-collision arresting plane out of the rear plane of the center bag section, in such a manner as to be continuous with the front-collision arresting plane and extend toward an inboard side in a vehicle width direction from the front-collision arresting plane. Moreover, the airbag may be formed without an arresting recess disposed between the front-collision arresting plane and oblique-collision arresting plane. Further, although the main bag section and center bag section are integral in the foregoing embodiments, the airbag may also be formed by jointing a part each of a main bag section and a center bag section which are separately provided, with a partial communication.

What is claimed is:

1. An airbag device for a front passenger seat adapted to be mounted on a vehicle having a rearview mirror which protrudes downwardly out of a roof of the vehicle, the airbag device comprising a housing adapted to be mounted on an instrument panel of the vehicle disposed in front of a front passenger seat, and an airbag that is housed in the housing in a folded-up configuration and inflatable with an inflation gas for rearward deployment, the airbag comprising:
    a main bag section that protrudes rearward out of the housing and deploys in front of the front passenger seat;
    a center bag section that protrudes towards an inboard side in a vehicle width direction out of the main bag section and deploys in front of a space between the front passenger seat and a driver's seat, the center bag section as deployed including, on an upper portion thereof, a region that faces the rearview mirror in an up and down direction;
    a passenger protection region that is composed of a rear portion of the airbag as deployed for protecting a passenger, the passenger protection region comprising a front-collision arresting plane for protecting a head of the passenger in the event of a frontal collision of the vehicle and an oblique-collision arresting plane that is disposed on an inboard side in the vehicle width direction of the front-collision arresting plane for protecting the head of the passenger as the passenger moves diagonally forward in the event of an oblique collision or an offset collision of the vehicle; and
    a regulating tether that is disposed generally along an up and down direction inside the center bag section and connects the region of the upper portion of the center bag section facing the rearview mirror at airbag deployment and a region of a lower portion of the center bag section which is deployed beneath the region facing the rearview mirror, in order to prevent contact between the center bag section and the rearview mirror.

2. The airbag device for a front passenger seat of claim 1, wherein a length in an up and down direction of the regulating tether is smaller than a width in an up and down direction of the center bag section as inflated by itself.

3. The airbag device for a front passenger seat of claim 1, wherein:
    the regulating tether is formed into a band and disposed such that a width direction thereof generally coincides with a width direction of the rearview mirror; and
    a width of an upper end region of the regulating tether is generally identical to a width of the rearview mirror and greater than a width of a lower end region of the regulating tether.

4. The airbag device for a front passenger seat of claim 3, wherein the regulating tether bifurcates in a front and rear direction towards the upper end region.

5. The airbag device for a front passenger seat of claim 1, wherein:
    the center bag section includes, at the region of the upper portion facing the rearview mirror at airbag deployment, a recessed region that is recessed downwardly relative to a peripheral region for receiving the rearview mirror therein at airbag deployment;
    the recessed region is formed by jointing together peripheral edges of a part each of more than one base materials of the center bag section; and
    the regulating tether connects a bottom of the recessed region and the region of the lower portion of the center bag section to be deployed beneath the region facing the rearview mirror.

6. The airbag device for a front passenger seat of claim 1, wherein the regulating tether is disposed at such a region that is suppressed from interfering with the head of the passenger when the passenger protection region catches the passenger at airbag deployment.

7. The airbag device for a front passenger seat of claim 1, further comprising:
    an arresting recess that is recessed forward between the front-collision arresting plane and the oblique-collision arresting plane for catching and arresting the head of the passenger therein; and
    a recess-pulling tether that is disposed inside the airbag and pulls a bottom of the arresting recess forward at airbag deployment.

8. The airbag device for a front passenger seat of claim 1, wherein:
    the main bag section includes a rear side wall that is deployable to face the front passenger seat and constitutes the front-collision arresting plane;
    the center bag section includes a protruding inflatable section that protrudes farther rearward than the rear side wall of the main bag section at airbag deployment; and the oblique-collision arresting plane is composed of a region of the protruding inflatable section that is continuous with the rear side wall of the main bag section and rises rearward out of the rear side wall.

9. The airbag device for a front passenger seat of claim 8, further comprising:
an arresting recess that is recessed forward between the front-collision arresting plane and the oblique-collision arresting plane for catching and arresting the head of the passenger therein; and
a recess-pulling tether that is disposed inside the airbag and pulls a bottom of the arresting recess forward at airbag deployment.

10. The airbag device for a front passenger seat of claim 9, further comprising, inside the airbag, a recess-directing tether that connects the bottom of the arresting recess and an inboard side wall in a vehicle width direction of the center bag section for, in combination with the recess-pulling tether, deploying the arresting recess generally along a moving direction of the head of the passenger which moves diagonally forward.

* * * * *